(12) United States Patent
Kihira et al.

(10) Patent No.: US 8,304,141 B2
(45) Date of Patent: Nov. 6, 2012

(54) STAINLESS STEEL, TITANIUM, OR TITANIUM ALLOY SOLID POLYMER FUEL CELL SEPARATOR AND ITS METHOD OF PRODUCTION AND METHOD OF EVALUATION OF WARP AND TWIST OF SEPARATOR

(75) Inventors: Hiroshi Kihira, Futtsu (JP); Michio Kaneko, Futtsu (JP); Mitsuharu Yamagata, Futtsu (JP); Koki Tanaka, Futtsu (JP); Yoichi Ikematsu, Futtsu (JP); Yoichi Matsuzaki, Futtsu (JP); Kazuto Kawakami, Futtsu (JP); Wataru Hisada, Kitanagoya (JP); Suguru Suzuki, Kitanagoya (JP)

(73) Assignee: Sintokogio Ltd., Aichi (JP)

( * ) Notice: Subject to any disclaimer, the term of this patent is extended or adjusted under 35 U.S.C. 154(b) by 301 days.

(21) Appl. No.: 12/806,764

(22) Filed: Aug. 20, 2010

(65) Prior Publication Data
US 2011/0032537 A1 Feb. 10, 2011

Related U.S. Application Data

(62) Division of application No. 11/922,302, filed as application No. PCT/JP2006/312939 on Jun. 22, 2006, now Pat. No. 7,807,281.

(30) Foreign Application Priority Data

Jun. 22, 2005 (JP) .................................. 2005-182259
Jun. 23, 2005 (JP) .................................. 2005-183183

(51) Int. Cl.
*H01M 4/64* (2006.01)
*G01B 11/24* (2006.01)

(52) U.S. Cl. ......... 429/517; 429/519; 429/522; 356/601

(58) Field of Classification Search .................. 429/519, 429/517, 518, 522, 535, 507; 427/115, 123; 356/614, 601, 622; 428/546, 548, 212, 332, 428/379, 389
See application file for complete search history.

(56) References Cited

U.S. PATENT DOCUMENTS

| 2003/0224236 A1* | 12/2003 | Morita et al. .................... 429/34 |
| 2005/0089742 A1* | 4/2005 | Ishigami et al. ................ 429/34 |

FOREIGN PATENT DOCUMENTS

| JP | 10-228914 A | 8/1998 |
| JP | 11-121018 | 4/1999 |
| JP | 11-126621 A | 5/1999 |
| JP | 11-126622 A | 5/1999 |
| JP | 11-219713 A | 8/1999 |
| JP | 11-260383 A | 9/1999 |
| JP | 2000-21419 A | 1/2000 |
| JP | 2000-256808 A | 9/2000 |
| JP | 2000-260439 A | 9/2000 |
| JP | 2000-309854 A | 11/2000 |
| JP | 2001-006713 A | 1/2001 |
| JP | 2001-32056 A | 2/2001 |
| JP | 2001-089870 A | 4/2001 |
| JP | 2001-250565 A | 9/2001 |
| JP | 2001-357862 A | 12/2001 |
| JP | 2002-025586 | 1/2002 |
| JP | 2002-075401 | 3/2002 |
| JP | 2002-190305 | 7/2002 |
| JP | 2002-313354 | 10/2002 |
| JP | 2003-123783 A | 4/2003 |
| JP | 2003-160884 A | 6/2003 |
| JP | 2003-193206 A | 7/2003 |
| JP | 2003-223904 A | 8/2003 |
| JP | 2004-002960 A | 1/2004 |
| JP | 2004-076124 A | 3/2004 |
| JP | 2004-107704 A | 4/2004 |
| JP | 2004-124197 A | 4/2004 |
| JP | 2004-156132 A | 6/2004 |
| JP | 2004-220908 | 8/2004 |
| JP | 2004-232074 A | 8/2004 |
| JP | 2004-265855 | 9/2004 |
| JP | 2004-269969 A | 9/2004 |
| JP | 2004-273370 A | 9/2004 |
| JP | 2004-306128 A | 11/2004 |
| JP | 2006-040608 A | 2/2006 |
| JP | 2006-140095 A | 6/2006 |
| WO | WO 01/28018 A1 | 4/2001 |
| WO | WO 2005/047567 A1 | 5/2005 |

* cited by examiner

*Primary Examiner* — Raymond Alejandro
(74) *Attorney, Agent, or Firm* — Kenyon & Kenyon LLP

(57) ABSTRACT

The present invention releases a method of producing a metal separator for a solid polymer fuel cell by stainless steel, titanium, or titanium alloy during which securing lower cost and mass producibility by using a material having a high workability to form a complicated shape by a high productivity, then using an inexpensive blast process to drive a conductive substance into the surface of the metal separator member, that is, provides a stainless steel, titanium, or titanium alloy solid polymer fuel cell separator comprised of stainless steel, titanium, or titanium alloy in the surface of which a low ion release conductive substance is buried, having an arithmetic mean roughness (Ra) of the separator surface of 0.5 to 5.0 µm, having a 10-point mean roughness (Rz) of 3 to 20 µm, having an average spacing of surface relief shapes (Sm) of 300 µm or less, having values of a warp rate and twist rate of a separator of 0.1 or less, and having a contact resistance value with respect to carbon paper of 15 mΩcm² or less at a surface pressure of 1 MPa.

6 Claims, 4 Drawing Sheets

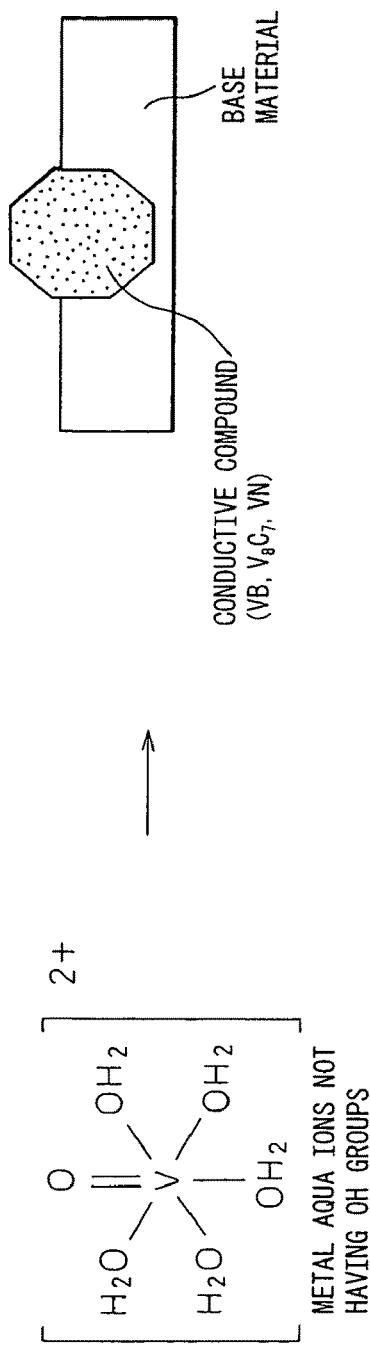
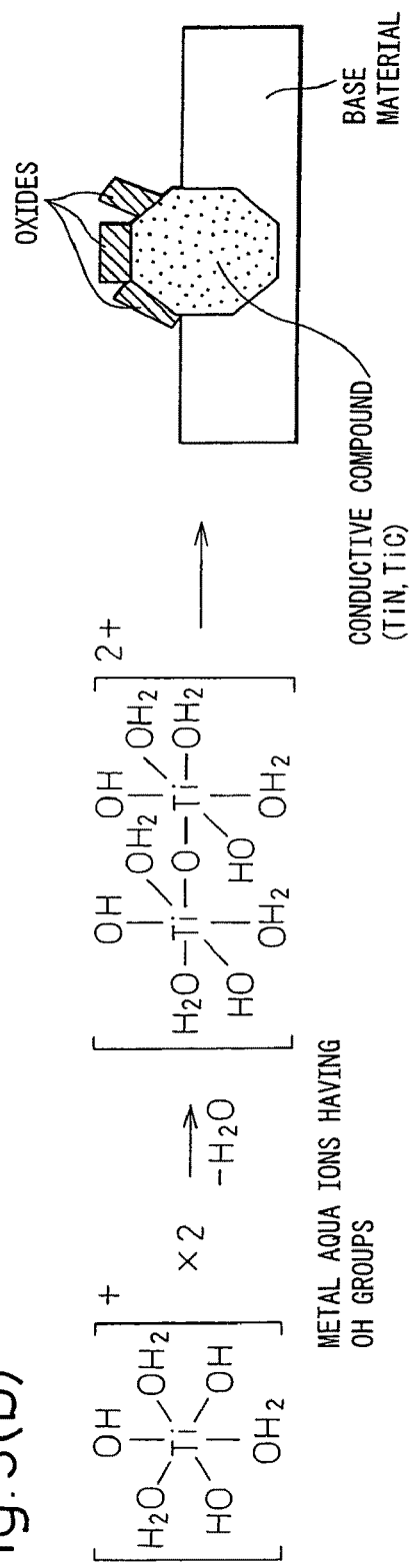

(a)          (b)

STAINLESS STEEL, TITANIUM, OR TITANIUM ALLOY SOLID POLYMER FUEL CELL SEPARATOR AND ITS METHOD OF PRODUCTION AND METHOD OF EVALUATION OF WARP AND TWIST OF SEPARATOR

This application is a divisional application under 35 U.S.C. §120 and §121 of U.S. application Ser. No. 11/922,302, filed Dec. 13, 2007, now U.S. Pat. No. 7,807,281, which is a 35 U.S.C. §371 of PCT/JP2006/312939 filed Jun. 22, 2006, which claims priority to Japanese Application Nos. 2005-182259 filed Jun. 22, 2005 and 2005-183183 filed Jun. 23, 2005, each of which is incorporated by reference in its entirety.

TECHNICAL FIELD

The present invention relates to a solid polymer fuel cell separator used for automobiles, small sized power generating systems, etc. using electric power as a direct drive source and its method of production, more particularly relates to a method of evaluation of warp and twist of a separator. More particularly, it relates to a solid polymer fuel cell member separator which is treated on its surface by a low ion release conductive substance to enhance the flatness of the separator and lower the electrical contact resistance of its surface.

BACKGROUND ART

In recent years, rapid progress is starting to be made in development of fuel cells for electric cars due to the success in development of a solid polymer material. A solid polymer fuel cell differs from a conventional alkali type fuel cell, phosphoric acid fuel cell, molten carbonate fuel cell, solid electrolyte fuel cell, etc. in that it uses a hydrogen ion-selective transmission type organic membrane as an electrolyte.

This is a system which obtains electric power by using as the fuel of the solid polymer fuel cell, in addition to pure hydrogen, hydrogen gas obtained by modification of alcohol etc. and electrochemically controls the reaction with the oxygen in the air.

A solid polymer film functions sufficiently even if thin and has the electrolyte fixed in the membrane, so if controlling the dew point in the cell, it functions as an electrolyte, so there is no need to use an aqueous solution-based electrolyte, a molten salt-based electrolyte, or other medium with fluidity and enables the cell itself to be compactly and simply designed. Development work is proceeding on application for electric cars etc. As the material for forming a solid polymer fuel cell operating in a region of 150° C. or so or less, a carbon-based material is being used due to the reasons that the temperature is not that high, corrosion resistance and durability can be sufficiently exhibited under that environment, etc., but due to the issue of brittleness, it cannot be made thin and therefore it obstructs greater compactness. Furthermore, breakage-resistant carbon-based separators are also being developed, but these are expensive cost-wise. For this reason, serious R&D is being conducted on stainless steel, titanium, and titanium alloy separators able to achieve the goals in both respects.

A solid polymer fuel cell is comprised of a solid polymer film forming an electrolyte, catalytic electrode parts on the two sides of the same and comprised of carbon fine particles and precious metal superfine particles, current collectors comprised of felt-like carbon fiber composites having the functions of taking out the electric power generated there as current and simultaneously supplying reaction gas to the catalytic electrode parts (usually called "carbon paper"), separators receiving the current from there and separating the two types of reaction gas of mainly oxygen and mainly hydrogen and the cooling medium, etc. stacked together.

The configuration of a typical solid polymer fuel cell is shown in FIG. 1.

A solid polymer fuel cell 1 is composed by stacking a solid polymer film 2 forming an electrolyte, catalytic electrode parts 3 provided on this solid polymer film 2 and comprised of carbon fine particles and precious metal superfine particles, current collectors comprised of felt-like carbon fiber composites having the functions of taking out the electric power generated by the catalytic electrode parts 3 as current and supplying reaction gas comprised of mainly oxygen gas or mainly hydrogen gas to the catalytic electrode parts 3 (usually called "carbon paper 4"), and separators 5 receiving current from the carbon paper 4 and separating the mainly oxygen gas and mainly hydrogen gas.

The basic principle of a solid polymer fuel cell 1 is basically as follows: That is, in the solid polymer fuel cell 1, fuel comprised of hydrogen gas ($H_2$) 8 is supplied from an anode side 6, passes through gas diffusion layers comprised of carbon paper 4 and a catalytic electrode part 3, forms hydrogen ions ($H^+$), and passes through the electrolyte comprised of the solid polymer film 2. At the catalytic electrode part 3 of a cathode side 7, an oxidation reaction ($2H^+ + 2e^- + \frac{1}{2}O_2 \rightarrow H_2O$) occurs between the hydrogen ions ($H^+$) and the oxygen ($O_2$) in the air 9 supplied from the cathode side 7 and water ($H_2O$) is produced. At the time of this oxidation reaction, the electrons generated at the catalytic electrode part 3 on the anode side 6 are run through the carbon paper 4 from the separator 5 of the anode side 6 to the separator 5 of the cathode side 7, whereby current and voltage are generated between the two electrodes.

Each solid polymer film 2 is comprised of an electrolyte having a strong acidity fixed in a membrane. By controlling the dew point in the cell, it functions as an electrolyte allowing the passage of hydrogen ions ($H^+$).

The separators 5, component members of the solid polymer fuel cell 1, separate the two types of reaction gas, that is, the air 9 at the cathode side 7 and the hydrogen gas 8 of the anode side 6, and act as channels for supplying the reaction gas and discharge the water formed by the reaction from the cathode side 7. Further, in general, the solid polymer fuel cell 1 uses a solid polymer film comprised of an electrolyte exhibiting a strong acidity, operates at a temperature of about 150° C. or less due to the reaction, and produces water, so the separators 5 for the solid polymer fuel cell are required to have corrosion resistance and durability as material properties and are required to have good conductivity and a low contact resistance with the carbon paper for efficiently conducting the current through the carbon paper 4.

The inventors have already disclosed the specific shape, ingredients, etc. for use of stainless steel as a separator or other solid polymer fuel cell member by Japanese Patent Publication (A) No. 2000-260439 and Japanese Patent Publication (A) No. 2000-256808.

However, in these, the avoidance of cracking or warping by stabilization of the working process and the further reduction of costs in measures for reducing the electrical contact resistance of the surface remained as problems for commercialization.

In stainless steel, titanium, or titanium alloy separators, the contact resistance with the carbon paper forming the current collectors is large, so causes a large drop in the energy efficiency of the fuel cell. This has been pointed out as a problem. In view of this situation, the contact resistance between the different materials used is being studied. Low contact resistance materials for solid polymer fuel cell members for obtaining the maximum energy conversion efficiency of solid polymer fuel cells are also being studied.

As such an invention, up until now Japanese Patent Publication (A) No. 10-228914 discloses a fuel cell separator obtained by press forming SUS304 to form a bulged part with a large number of surface relief shapes at the inner circumference and by forming a gold plated layer of a thickness of 0.01 to 0.02 µm at the end face at the bulged front end.

Further, Japanese Patent Publication (A) No. 2001-6713 discloses a low contact resistance stainless steel, titanium, separator, etc. for a solid polymer fuel cell characterized by depositing a precious metal or precious metal alloy on parts contacting other parts and generating a contact resistance and lowering the contact resistance with the carbon paper.

However, these all take the form of using a precious metal to lower the contact resistance. From the viewpoint of further reducing costs and saving scarce resources, a method lowering the contact resistance without using a precious metal is desirable.

Therefore, as a measure for keeping down the use of the precious metal, the technique of causing the precipitation of chrome and carbon in the stainless steel in the annealing process and conducting current through the chrome carbides exposed at the surface from a passivation film so as to lower the contact resistance has been disclosed in Japanese Patent Publication (A) No. 2000-309854. However, this method requires too much time for the annealing process of the stainless steel and is liable to reduce the productivity and to increase the costs. Conversely, if shortening the annealing time to lower the costs, metallurgically chrome-deficient layers are liable to form around the precipitated chrome carbides and lower the corrosion resistance. Furthermore, working the separator requires a strong working process, so if a large amount of chrome carbides precipitate in the metal structure before working, cracks are liable to occur during the working process.

As a method for keeping down the use of precious metals, a low temperature type fuel cell separator using stainless steel as a base material, providing a film in which compound particles are dispersed at its surface at the surface of the base material, and heating this in a nonoxidizing atmosphere to 300 to 1100° C. to break down and eliminate the film ingredients and forming SiC, $B_4C$, $TiO_2$, or other deposits on its surface to reduce the contact resistance and its method of production are disclosed in Japanese Patent Publication (A) No. 11-260383 and Japanese Patent Publication (A) No. 11-219713. This method requires time and effort for the process of heating in a nonoxidizing atmosphere to 300 to 1100° C. to break down and eliminate the film ingredients, so is liable to increase the costs.

Further, as a separator obtained by combining a carbon material and metal, a solid polymer fuel cell separator comprised of a metal sheet for forming the separator which is press formed etc. at the main part where the electrodes are to be positioned so as to form gas channels and which is formed with a carbon-based conductive coating layer at its front surface part is disclosed in Japanese Patent Publication (A) No. 2000-021419; a low temperature type fuel cell separator comprised of a stainless steel base material on which carbon powder is dispersed and press bonded to improve the conductivity is disclosed in Japanese Patent Publication (A) No. 11-121018; a low temperature type fuel cell separator comprised of stainless steel as a base material on the surface of which an Ni—Cr-based plated layer in which carbon-based particles are dispersed is disclosed in Japanese Patent Publication (A) No. 11-126621; and furthermore a low temperature type fuel cell separator comprised of stainless steel as a base material on the surface of which a Ta, Ti, or Ti—Ta-based plated layer in which carbon-based particles are dispersed is formed is disclosed in Japanese Patent Publication (A) No. 11-126622.

Such attempts at placing carbon at the metal side to reduce the contact resistance at the interface between the carbon paper and the stainless steel or other metal part were good tries, but the contact resistance occurring at an interface does not just occurs due to the passivation film at the metal side. The inventors discovered that in the electron structure of the interface between the carbon and metal, a pseudo Schottky barrier occurs at the carbon side and, due to this, a large contact resistance occurs. As a result of tests to reproduce this, there was the problem that a low contact resistance state could not be stably realized.

In this way, development of technology for producing metal separators utilizing the expression of corrosion resistance by a passivation film of stainless steel or titanium or titanium alloy, greatly reducing the contact resistance, and enabling even complicated working and enabling production at a low cost is extremely difficult at present.

On the other hand, it is necessary to realize a complicatedly worked shape to function as a metal separator, so the stainless steel or titanium or titanium alloy are required to have extreme workability. Therefore, if looking forward to the reduction in costs due to the future improvement of material productivity and improvement of productivity in the process of working complicatedly shaped separators, it is desirable to greatly reduce the precipitates in the metal structure obstructing material productivity and elongation at the time of working.

Therefore, for the purpose of reducing the contact resistance, a stainless steel or a titanium or titanium alloy material in which a conductive compound or metal phase is precipitated in the metal structure is disclosed in Japanese Patent Publication (A) No. 2000-309854, Japanese Patent Publication (A) No. 2004-107704, Japanese Patent Publication (A) No. 2004-156132, Japanese Patent Publication (A) No. 2004-273370, Japanese Patent Publication (A) No. 2004-306128, Japanese Patent Publication (A) No. 2004-124197, Japanese Patent Publication (A) No. 2004-269969, Japanese Patent Publication (A) No. 2003-223904, Japanese Patent Publication (A) No. 2004-2960, and Japanese Patent Publication (A) No. 2004-232074, but from the viewpoint of realizing extreme productivity and reducing the costs in the material production and working process, seen rationally, problems are believed to remain.

Due to this situation, as a practical problem, stainless steel or titanium or titanium alloy first of all basically require productivity and workability being stressed in the material design and production process design. The materials surviving this selection process are probably materials such as high workability and high productivity stainless steel like in for example Japanese Patent Publication (A) No. 2006-040608.

However, in measures for reducing the electrical contact resistance of the surface, further reduction of the cost is an issue which must be solved for commercialization.

From the above, as the treatment for a conductive surface given after working high workability stainless steel or titanium for a solid polymer fuel cell metal separator, as explained above, under the present circumstances, gold plating is recognized as the mainstream.

This current mainstream method is criticized as having problems in terms of costs or resources. Much technology is being developed to enable use of precious metals to be kept down.

For example, Japanese Patent Publication (A) No. 2003-123783 discloses a method of forming one or more types of conductive ceramic layers of TiN, TiC, CrC, TaC, $B_4C$, SiC, WC, TiN, ZrN, CrN, and HfC at a stainless steel separator fuel electrode side.

As specific coating methods, vapor deposition or dry coating may be illustrated, but if using a vacuum apparatus etc. to dry coat these substances, there are restrictions on the film forming rate. The yield of the coated substance unavoidably drops, so the costs are liable to increase.

Further, a titanium or titanium alloy bipolar plate (separator) comprised of a base material on the surface of which conductive hard particles are dispersed and exposed by burying conductive hard particles of the $M_{23}C_6$ type, $M_4C$ type, or MC type, where the metal element (M) includes one or more of chrome, iron, nickel, molybdenum, tungsten, and boron, buried in the surface of the base material is disclosed in Japanese Patent Publication (A) No. 2001-357862, while a stainless steel and stainless steel separator where at least one of $M_{23}C_6$ type, $M_4C$ type, $M_2C$ type, and MC type carbide-based metal inclusions and $M_2B$ type boride-based metal inclusions is dispersed and exposed, where the metal element (M) includes one or more of chrome, molybdenum, and tungsten, and where the surface roughness of the stainless steel is a centerline average roughness Ra of 0.06 to 5 µm is disclosed in Japanese Patent Publication (A) No. 2003-193206.

In the latter, it is described that it is possible to form hard fine powder having this conductivity as shot.

However, in general, solid polymer fuel cells have a low output voltage per cell of a low 1V or so, so to obtain the desired output, often a large number of fuel cells are stacked and used as stacked fuel cells. For this reason, in the method of fixing hard fine powder having conductivity on the surface of a base material by shot etc., it is necessary to suppress the occurrence of warping or strain at the separators and set the conditions and perform post-treatment to obtain separators having a good flatness enabling stacking of the fuel cells, but with this method, there are the problems that the separators will deform after shaping and not be able to be stacked. Commercialization is not possible so long as the optimal conditions are not found.

Therefore, the inventors invented the method of firing a solid plating material comprised of core particles having a higher hardness than the separator and coated with a metal having a high corrosion resistance and lower contact resistance than carbon to a separator forming a fuel cell so as to forcibly deposit the metal coated on this solid plating material on the separator and disclosed it in Japanese Patent Publication (A) No. 2001-250565. Further, they discovered that by using this technique to bury a very small amount of precious metal in stainless steel or titanium or a titanium alloy, even if not covering the entire surface with a precious metal such as with gold plating, a sufficient low contact resistance is obtained and made the invention shown in Japanese Patent Publication (A) No. 2001-6713.

In this method, a precious metal is used, so without further reduction of the costs, commercialization is not possible.

Therefore, the inventors engaged in further improvements and trial and error based on the technology of Japanese Patent Publication (A) No. 2001-250565 and as a result, as disclosed in Japanese Patent Publication (A) No. 2001-89870, Japanese Patent Publication (A) No. 2003-160884, Japanese Patent Publication (A) No. 2004-76124, and International Publication WO2005/047567, invented a method of production of coated superhard particles for driving any conductive substance into a metal surface characterized by using core particles of an average particle size of 2 mm or less as cores and lightly sintering and coating these on their surfaces with fine powder of any conductive substance of an average particle size of 0.5 mm or less.

However, with this method, there was the problem that the separators deformed after shaping and could not be stacked.

As explained above, in technology for producing metal separators for solid polymer fuel cells, which are predicted on tough working processes and require extremely low costs and mass productivity, a method of securing a high productivity and high workability in the material itself and thereby realizing a process for working complicated shapes with a high productivity and using an inexpensive high productivity machining process after shaping to drive a conductive substance or conductive metal into just the member surface is most promising. In this sense, the methods and materials and members disclosed in Japanese Patent Publication (A) No. 2003-123783, Japanese Patent Publication (A) No. 2001-357862, Japanese Patent Publication (A) No. 2003-193206, Japanese Patent Publication (A) No. 2001-250565, and Japanese Patent Publication (A) No. 2001-6713 are expected to become the mainstream in the future.

However, in these as well, no improvement in the cell performance can be expected without low cost, low electrical contact resistance surface treatment.

If considering basically this technical direction, if envisioning use of conductive substances buried in surfaces in large amounts in the future, freedom from most restrictions in the amounts of resources, low cost, and above all resistance to ion release at the surface of the metal separator exposed to a corrosive environment are important keys. Further, since the blast (shot) method is used after working to mechanically drive the substances in the surfaces, it is important to finish the members into flat shapes able to withstand the process of stacking after treatment.

In regard to the point of resistance to release of ions or various types of cations from the driven-in deposits, as disclosed in Japanese Patent Publication (A) No. 2001-250565 and Japanese Patent Publication (A) No. 2001-6713, it is sufficient to drive in and bury a precious metal, but in terms of the amount of resources or cost competitiveness, the metal carbide- or metal boride-based substances disclosed in Japanese Patent Publication (A) No. 2001-357862 and Japanese Patent Publication (A) No. 2003-193206 are superior. However, in the latter, if members are exposed to the corrosive environment in solid polymer fuel cells, at least the conductive substances are liable to be corroded, release ions, contaminate the MEA (composite of solid polymer electrolyte film and electrode), and lower the power generating ability of the fuel cells.

Therefore, it is necessary to simultaneously resolve the two problems of discovering conductive substances with ion releases so small as to be able to approach precious metals and of realizing flat shapes after treating the worked separator members. Note that in the method of treatment of using the blast method after working so as to mechanically drive a conductive substance into the surface of a worked product, no approach relating to the realization of the flatness of the treated product by making the matrix metal separator worked product out of an extremely thin material has yet been invented. That is, R&D to establish indicators for quantitative evaluation and building up technical knowhow to achieve the target indicator values is becoming essential.

DISCLOSURE OF THE INVENTION

In consideration of the state of the prior art, the present invention has as its object the provision of a solid polymer fuel cell separator comprised of stainless steel, titanium, or a titanium alloy having a surface layer part to which conductive substance particles are fixed, where, at the time of use of the fuel cell, there is little drop in the electromotive force due to deterioration of the contact resistance of the separator surface and deterioration of the cell properties, the contact resistance of the separator surface with the carbon paper is low, and furthermore the flatness for stacking is superior, and its method of production. That is, the present invention has as its object the simultaneous solution of the two problems of the discovery of conductive substances with extremely small ion release and flatness of the separator member shape after treatment and thereby, when making the metal separator for a solid polymer fuel cell a stainless steel alloyed with 11 mass % or more of Cr or titanium or a titanium alloy, securing lower cost and mass productivity by using a material having a high workability to form complicated shapes with a high productivity, then using an inexpensive blast process to drive conductive substances into the metal separator member surface.

The gist of the present invention is as follows:

(1) A solid polymer fuel cell separator comprised of stainless steel, titanium, or a titanium alloy at part or all of the surface of which a low ion release conductive substance is buried, said stainless steel, titanium, or titanium alloy solid polymer fuel cell separator characterized in that said separator surface has an arithmetic mean roughness (Ra) of 0.5 to 5.0 μm, a 10-point mean roughness (Rz) of 3 to 20 μm, and an average spacing of surface relief shapes (Sm) of 300 μm or less, at predetermined positions near the four corners of said separator, when an origin is O, placing L near a corner in a rolling direction of the sheet from the origin O, C near a corner in a direction vertical to rolling direction from the origin O, and X near a corner in a diagonal direction from the origin O, a length of a line segment between OL is LL, a length of an OC line segment is LC, a length between OX is LX, a maximum strain height from the line OL to the center plane in a thickness direction of the worked member is HL1, one from the line CX is HL2, one from the line OC is HC1, one from the line LX is HC2, one from the line OX is HXC, and a distance between a point X and a plane formed by the three points O, L, and C is HXT, the values of warp rates $W_{L1}$, $W_{L2}$, $W_{C1}$, $W_{C2}$, and $W_{XC}$ defined by equation <1> to equation <5> and the values of twist rates $T_{XL}$ and $T_{XC}$ defined by equation <6> to equation <7> are 0.1 or less and, furthermore, the contact resistance value with respect to carbon paper is 15 mΩcm² or less at a surface pressure of 1 MPa:

$$\text{Front side } L \text{ direction warp rate: } W_{L1} = \frac{|HL1|}{LL} \quad <1>$$

$$\text{Back side } L \text{ direction warp rate: } W_{L2} = \frac{|HL2|}{LL} \quad <2>$$

$$\text{Left side } C \text{ direction warp rate: } W_{C1} = \frac{|HC1|}{LC} \quad <3>$$

$$\text{Right side } C \text{ direction warp rate: } W_{C2} = \frac{|HC2|}{LC} \quad <4>$$

$$\text{Diagonal direction warp rate: } W_{XC} = \frac{|HXC|}{LX} \quad <5>$$

$$L \text{ direction length reference twist rate: } T_{XL} = \frac{|HXT|}{LL} \quad <6>$$

$$C \text{ direction length reference twist rate: } T_{XC} = \frac{|HXT|}{LC} \quad <7>$$

(2) A stainless steel, titanium, or titanium alloy solid polymer fuel cell separator as set forth in (1), wherein said low ion release conductive substance contains at least one of Au, WC, or WB and a balance of unavoidable impurities.

(3) A stainless steel, titanium, or titanium alloy solid polymer fuel cell separator as set forth in (1), wherein said low ion release conductive substance contains TaN or TaN and at least one of WC or WB mixed together and a balance of unavoidable impurities.

(4) A stainless steel, titanium, or titanium alloy solid polymer fuel cell separator as set forth in (2) or (3), containing as said unavoidable impurities at least one of Co, Cr, Ni, Fe, Cu, and Sn at the surface of solid polymer fuel cell separator surface.

(5) A stainless steel, titanium, or titanium alloy solid polymer fuel cell separator as set forth in (1), wherein said low ion release conductive substance is one or more of VB, $V_8C_7$, and VN.

(6) A stainless steel, titanium, or titanium alloy solid polymer fuel cell separator as set forth in (5), wherein said low ion release conductive substance has an average particle size of 0.01 to 20 μm and a mass ratio of metal oxides formed at the surface layer to the conductive substance particles as a whole is 30% or less.

(7) A method of production of a stainless steel, titanium, or titanium alloy solid polymer fuel cell separator comprising firing, riding on a stream of air of a pressure of 0.4 MPa, coated superhard particles comprised of superhard core particles with an average size of less than 200 μm, around which a 20 μm or less low ion release conductive substance is coated, at part or all of a surface of stainless steel, titanium or titanium alloy so as to bury a low ion release conductive substance in it to make it conductive.

(8) A method of production of a stainless steel, titanium, or titanium alloy solid polymer fuel cell separator as set forth in (7), further comprising, during said firing, placing a lattice-shaped mesh fixture between the stainless steel, titanium, or titanium alloy and the ejection port of the coated superhard particles and then firing the coated superhard particles so as to disperse an impact energy of the coated superhard particles.

(9) A method of production of a stainless steel, titanium, or titanium alloy solid polymer fuel cell separator as set forth in (7) or (8), wherein said low ion release conductive substance contains at least one of Au, WC, or WB and a balance of unavoidable impurities.

(10) A method of production of a stainless steel, titanium, or titanium alloy solid polymer fuel cell separator as set forth in (7) or (8), wherein said low ion release conductive substance is comprised of 0.02 mass % or more of TaN and at least one of WC or WB mixed together and a balance of unavoidable impurities.

(11) A method of production of a stainless steel, titanium, or titanium alloy solid polymer fuel cell separator as set forth in (7) or (8), wherein said low ion release conductive substance is comprised of at least one of VB, $V_8C_7$, and VN.

(12) A method of production of a stainless steel, titanium, or titanium alloy solid polymer fuel cell separator as set forth in (11), wherein said low ion release conductive substance has an average particle size of 0.01 to 20 μm and a mass ratio of the low ion release substance metal oxides formed on the surface layer of said low ion release conductive substance particles with respect to said particles as a whole is 30% or less.

(13) A method of production of a stainless steel, titanium, or titanium alloy solid polymer fuel cell separator as set forth in (12), further comprising, after said conductivity treatment, pickling the separator under conditions of a pH of 2 to 5 and a temperature of 40 to 80° C.

(14) A method of production of a stainless steel, titanium, or titanium alloy solid polymer fuel cell separator as set forth in any one of (7) to (13), wherein in said coated superhard particles, the superhard core particles are mainly comprised of WC and a balance of one or more of Co, Cr, Ni, and Fe in a total of 1 mass % or more and the coating layer contains at least one of Cu and Sn in a total of 1 mass % or more.

(15) A method of production of a stainless steel, titanium, or titanium alloy solid polymer fuel cell separator as set forth in any one of (7) to (14), wherein at least one of rolling or press forming is used to shape the stainless steel, titanium, or titanium alloy, then said firing is performed to control an internal stress balance of the separator.

(16) A method of evaluation of warp and twist of a stainless steel, titanium, or titanium alloy solid polymer fuel cell separator as set forth in any one of (1) to (6), which method of evaluation of warp and twist of a separator measures the 3D shape of said separator by a laser displacement meter and calculates digitalized 3D displacement data to calculate the values of equation <1> to equation <7>.

According to the present invention, when using the solid polymer fuel cell, the conductive substance particles fixed to the stainless steel separator surface layer part, titanium separator surface layer part, or titanium alloy separator surface layer part are ones with a low ion release property and further preferably can prevent the formation of oxides at the surfaces of the conductive substance particles after ion release. Therefore, it becomes possible to provide a stainless steel or titanium or titanium alloy solid polymer fuel cell separator having a contact resistance with carbon paper of a low 15 mΩcm$^2$ or less at a surface pressure of 1 MPa, having little deterioration of the low contact resistance at the time of use and resultant drop of the electromotive force, and having flatness sufficient for use for stacking fuel cells.

Fuel cell cars, fuel cell mobile PCs, and furthermore cogeneration using fuel cells etc. are expected to spread in the future. For their general application, sharp reductions in the costs of the component members are essential. The invention of the present application enables the production of a high performance stainless steel, titanium, or titanium alloy flat separator at a low cost.

BRIEF DESCRIPTION OF THE DRAWINGS

FIG. 3(a) is a cross-sectional schematic view showing the surface conditions in the case of an invention example where the conductive substance buried in the base material is a compound of a metal element forming metal aqua ions having one or no OH groups and shows an example of VB, $V_8C_7$, and VN as the conductive substance.

FIG. 3(b) is a cross-sectional schematic view showing the surface conditions in the case of a comparative example where the conductive substance buried in the base material is a compound of a metal element forming metal aqua ions having two or more OH groups and shows an example of TiN and TiC as the conductive substance.

BEST MODE FOR CARRYING OUT THE INVENTION

The present invention will be explained in detail below.

Figure 1:
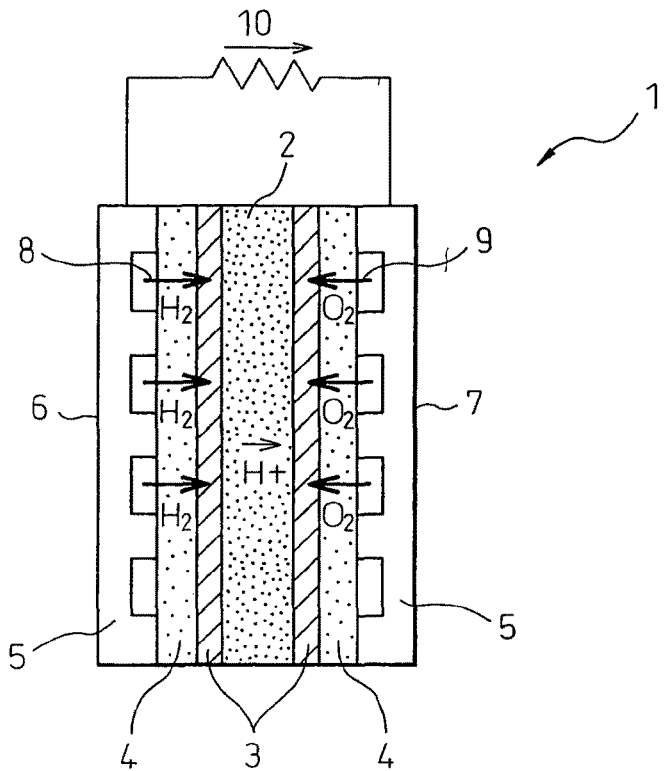
FIG. 1 is a view for explaining the configuration of a solid polymer fuel cell.

As explained above, the component member of the solid polymer fuel cell 1 shown in FIG. 1, that is, the separator 5, is required to have, as its basic property, a small contact resistance between the separator 5 surface and carbon paper 4 when receiving conductivity, in particular current from the carbon paper 4.

Further, the solid polymer fuel cell 1 has an electrolyte having a strong acidity, that is, the solid polymer film 2, and produces water by the reaction proceeding at a temperature of approximately 150° C. or less, so the material of the separator 5 is required to have corrosion resistance and durability sufficient to withstand a corrosive environment in an acidic aqueous solution at these temperatures.

Furthermore, a solid polymer fuel cell 1 is often used as a stacked fuel cell comprised of a large number of stacked cells in order to obtain the desired electric power, so that separator 5 is required to have a flatness sufficiently enabling use for stacking fuel cells.

Based on the above points, the present invention uses, as the material of the solid polymer fuel cell separator, stainless steel, titanium, or a titanium alloy having a good corrosion resistance under a corrosive environment of an acidic aqueous solution at said temperature and controls the type of the conductive substance and the shape of the separator predicated on the separator having a conductive substance at the surface layer part.

The inventors newly discovered that by using particles comprising conductive substances with extremely small ion release coated on superhard particles and using a low firing pressure to make them strike the surface of the stainless steel, titanium, or titanium alloy separator (below, these being referred to all together as a "metal separator"), it is possible to produce a separator with conductive substances with extremely small ion release buried at its surface and with a flat shape.

This will be explained in detail below.

The metal separator must be free of warping or twisting or must be extremely small since a large number of these is stacked to form a fuel cell. Further, surface conditions with a low electrical contact resistance are also important.

Therefore, the inventors engaged in numerous trial and error tests to bury low ion release conductive substances coated on the surfaces of superhard core particles in a metal separator surface exposed to a corrosive environment using the method of firing them at the surface of the metal separator (below, sometimes described as the blast method) and obtain a finished product almost completely free from warping or twisting.

As a result, with conductive hard particles with an average particle size of 200 μm or so disclosed in said Japanese Patent Publication (A) No. 2001-357862 and Japanese Patent Publication (A) No. 2003-193206, with just blasting, almost all of the relatively large sized particles end up being reflected, so a sufficient amount of conductive substance cannot be buried in the surface of the stainless steel or titanium or titanium alloy and stable reproducibility cannot be obtained in the contact resistance value.

If viewing the shape of the worked product after treatment, to bury large size particles in it, a large firing pressure of 0.5 MPa or so or more is necessary, so serious warping or twisting occurs. This also becomes a problem.

Therefore, to finish the product shape flat, they discovered that unless the average particle size of the particles made to strike the surface of the metal separator (usually the separator after shaping) by the blast method is less than 200 μm, the result will not go well and that 100 μm or so is optimal.

Specifically, they discovered that use of, as coated superhard particles, coated superhard particles comprised of superhard core particles with an average particle size of less than 200 μm coated on their surfaces with low ion release conductive substance powder with an average particle size of 20 μm or less is optimal in producing a flat metal separator.

If the average particles of the superhard core particles become 200 μm or more, even if adjusting the firing pressure in the blast treatment, obtaining a flat separator shape becomes difficult, so to stably secure a flatness enabling stacking required for a solid polymer fuel cell separator, it is preferable to make the average particle size of the superhard core particles less than 200 μm. More preferably, the average particle size of the superhard core particles should be 100 μm or less.

Further, as explained above, if the firing pressure is made 0.5 MPa or so, it is too strong and control of warping and twisting become impossible. That is, the methods disclosed in Japanese Patent Publication (A) No. 2001-357862 and Japanese Patent Publication (A) No. 2003-193206 are not inventions for realizing flatness. These belong to different conceptual frameworks from the invention of the present application.

Therefore, the inventors engaged in various studies, whereupon they learned that if the firing pressure exceeds 0.4 MPa, the strain of the surface layer part will increase and the flatness of the shape of the separator will deteriorate, so a firing pressure of 0.4 MPa or less is preferable and firing controlling the pressure to 0.1 to 0.3 MPa is optimum. Further, as firing treatment serving also to adjust the shape of a metal separator, a firing pressure of 0.005 MPa or so or more may be combined.

Further, in firing said coated superhard particles, the distance between the ejection port firing the coated superhard particles and the metal separator surface is not particularly stipulated, but is usually 10 to 1000 mm or so in range.

If using the coated superhard particles of the size of the present invention, even with a relatively low firing pressure, the conductive substance forming the coated layers suitably decays and peels off along with impact of the particles on the metal surface. Furthermore, there is the effect of this being hammered in by the coated superhard particles, so it was learned that the conductive fine powder is reliably buried in the metal surface.

Therefore, even if the firing pressure is low, if using said coated superhard particles, conductive substance with an average particle size 20 μm or less is buried dispersed in the surface of the treated product, a stable, low contact resistance state can be realized, and the contact resistance value with respect to carbon paper can be made 15 mΩcm$^2$ or less at a surface pressure of 1 MPa.

Furthermore, the inventors discovered that when adjusting fine deformation, at the time of firing by said blast method, by arranging a lattice-shaped mesh fixture between the metal separator and the ejection port of the coated superhard particles and then firing the coated superhard particles, the impact energy (compressive stress) of the coated superhard particles occurring at the metal separator surface can be dispersed to ease the impact and the metal separator can be more reliably flattened, so this technique is effective. The mesh of the lattice-shaped fixture may be 0.1 mm to 5.0 mm or so.

The inventors newly discovered the technology of effectively mechanically driving fine conductive substances into a metal surface by a relatively small firing pressure in this way and thereby enabled stable production of flat separators by the blast method—which had been considered impossible up to now.

As the framework for finding conductive substances having a low ion release property, the ion release property of the conductive substance itself, which had never been taken note of in the past, was studied.

Specifically, the conductive substances disclosed in Japanese Patent Publication (A) No. 2003-123783, that is, TiN, TiC, CrC, TaC, B$_4$C, SiC, WC, TiN, ZrN, CrN, and HfC, and the various types of metal carbides and metal borides and TaN and Au powder disclosed in Japanese Patent Publication (A) No. 2001-357862 and Japanese Patent Publication (A) No. 2003-193206 were respectively weighed out in 10 g amounts and used for the following deterioration test.

That is, to simulate the so-called sulfuric acid acidic corrosive environment in a solid polymer fuel cell where the solid polymer film decomposes and contaminates the cell, said conductivity powder was dispersed in 300 ml of a pH2 sulfuric acid aqueous solution and this was allowed to stand for 14 days at 80° C. while bubbling oxygen or hydrogen, then the amount of metal ion release in the supernatant obtained by this standing was analyzed.

Further, in parallel to this test, high corrosion resistance stainless steel samples of diameters of 30 mm and thicknesses of 4 mm had various types of conductive substances driven into them by the above coated superhard particle blast method, similar deterioration tests were conducted by the same test aqueous solution as the ion release test of the powder, and the change in the value of the contact resistance to carbon before and after this was measured.

The results obtained by these screening tests are as follows:

The substances which had a contact resistance value with respect to carbon paper at a surface pressure of 1 MPa of 15 mΩcm$^2$ or less from the start, maintained a similarly low contact resistance value even after the deterioration test, and had an amount of metal ion release from the conductive substance of 20 ppm or less are WC, WB, TaN, and Au.

Among these, the substances giving amounts of ion release below the detection limit of 0.05 ppm or less are TaN and Au.

In this way, the inventors studied the ion release property of the conductive substance itself, which was never taken note of in the past, in the present application. In addition to the Au and other precious metals from the past (see Japanese Patent Publication (A) No. 2001-250565 and Japanese Patent Publication (A) No. 2001-6713), the inventors discovered three types of conductive substances of WC, WB, and TaN.

Therefore, with the exception of the later-explained TaN, it is preferable to use superhard particles covered by a conductive substance having a low ion release property containing one or more of the three conductive substances of Au, WC, and WB. Further, firing treatment is preferably performed so that the content of the one or more of the conductive substances of Au, WC, and WB at the metal separator surface becomes 1 mass % or more. The balance includes unavoidable impurities.

However, use of Au, as explained above and as viewed from the perspective of price and the perspective of resources, is not desirable, so use of mainly WC and WB is recommended.

Next, a low ion release conductive substance containing TaN will be explained.

In solid polymer fuel cells at the present point of time, reduction of the pH is possible. Therefore, as an approach to further lower the amount of ion release, the inventors focused on the inclusion of TaN, which had an amount of ion release of the detection limit or less in the screening tests, mixed TaN powder with WC powder and TaN powder with WB powder in various ratios, and ran similar ion release tests again.

This being the case, in WC and WB in which TaN is mixed in an amount of 0.02 mass % or more, a large drop is seen in the amount of release of W ions. The tendency that as the TaN ratio becomes higher, the amount of ion release falls was discovered as shown in FIG. 2.

Therefore, it is preferable to use superhard particles coated with a conductive substance having an ion release property comprised of 0.02 mass % or more of TaN and one or more types of WC or WB mixed together.

Figure 2:
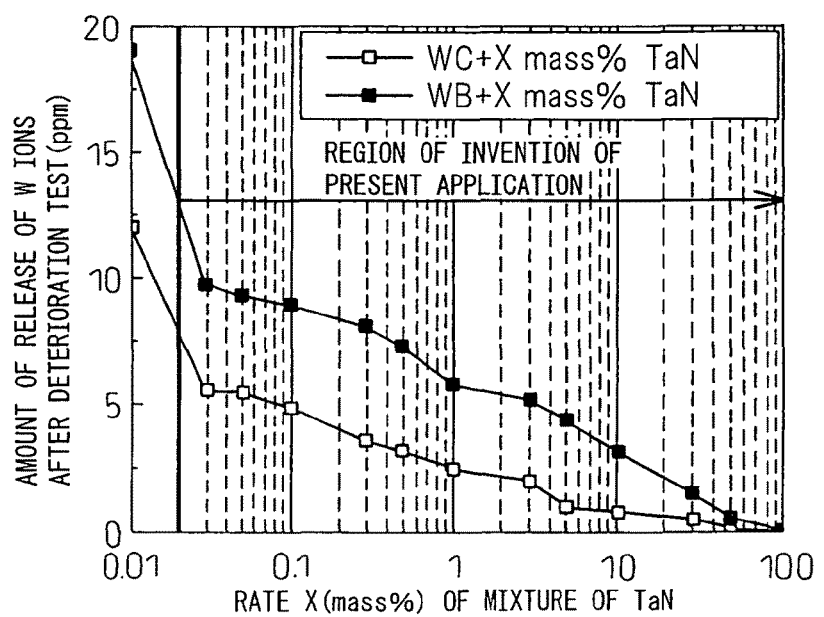
FIG. 2 is a view for explaining the further drop in the amount of ion release when mixing of TaN in insoluble conductive substances WC and WB.

Further, if viewed from the amount of ion release of W after the deterioration test, as shown in FIG. 2, WC is superior to WB. In terms of price, WB is more expensive than WC. TaN achieves both a superior low ion release property and low contact resistance performance by itself, so use without mixture gives the highest performance, but price-wise, this is more expensive than WC. Accordingly, to lower the cost, the ratio of the most inexpensive WC should be increased.

Note that the content of the one or more types of conductive substances of WC and WB should be suitably determined from the comparison with the cost. From the viewpoint of suppressing the amount of ion release, the content of WC and WB is ideally 0 mass %, but to secure lower cost, it is recommended that the content of one or more of WC and WB be 10 mass % or more.

As a result of observation by an electron microscope, it was learned that each of the carbides, nitrides, and borides used for said screening tests released ions slightly from their surfaces when placed in an acidic aqueous solution, but with WC and WB, nonstoichiochemical composition conductive oxides reprecipitated at the powder surface and lowered the amount of ion release.

Further, if adding TaN to WC or WB powder, the amount of ion release further falls probably because Ta ions further lower in solubility are mixed in with the W ions, composite conductive oxides are formed, and the solubility is further lowered.

Note that as explained above, the conductive fine powder also can include impurities, so inclusion of unavoidable impurities is allowed. However, the level of inclusion of impurity elements is desirably a level below the detection limit by electron beam energy spectroscopy.

Here, as the low ion release conductive substance, a conductive substance of a metal element forming metal aqua ions containing at most one OH group in an acidic aqueous solution is preferable. In particular, it may be comprised of one or more of VB, $V_8C_7$, and VN as compounds of the readily available V.

Regarding these conductive substances, furthermore it is preferable to define the average particle size of the conductive substance and the ratio of the metal oxides formed on the surface layer of the conductive substance to the substance particles as a whole. Below, this will be explained in detail.

The inventors confirmed from verification tests of the prior art etc. that a conventionally known separator comprised of stainless steel or titanium at the surface layer part of which conductive substance particles are fixed becomes greater in contact resistance between the separator surface and carbon paper along with the use of the solid polymer fuel cell and that due to this, the electromotive force of the fuel cell falls. Further, they learned that the cause of this drop in the electromotive force was that at the time of use of a fuel cell, the conductive substance particles fixed to the stainless steel separator surface layer part, titanium separator surface layer part, or titanium alloy separator surface layer part release ions, then oxides are formed at the surfaces of the conductive substance particles, whereby the conductive substance particles deteriorate in conductivity.

Further, the inventors used a large number of different types of conductive substance particles to intensively study the mechanism by which conductive substances are eluted and form oxides in the usage environment of solid polymer fuel cells, that is, an environment of 150° C. or less temperature and a strong acidity aqueous solution. As a result, they learned that after conductive substances are eluted, oxides are formed when the metal aqua ions engage in dehydrative condensation reactions with each other and that, further, the form of the metal aqua ions stably present differs depending on the metal element forming the conductive substance and its chemical form, in particular, in the case of using a conductive substance easily forming metal aqua ions having two or more OH groups, the dehydrative condensation reaction between the metal aqua ions becomes remarkable.

Furthermore, the inventors used stoichiochemical calculations to study the form of metal aqua ions able to be stably present in strong acidity aqueous solutions of pH2 at 80° C. In these calculations, they calculated the free energy change ΔG when up to a maximum six protons disassociate from the hexa aqua complex of the metal ions using the mFW1PW91 density functional method and SDD base function of the Gaussian03 program and COSMO method in order to consider the solvation. Furthermore, from the calculated ΔG, they calculated the equilibrium constant of the proton disassociation reaction of the metal aqua complex at pH2 and 80° C. and found the ratios of the various chemical species occurring due to proton disassociation. Examples of the results are shown in Table 1.

TABLE 1

Ratio of Presence of Various Hydrated N Metal Ions (%) pH 2, 80° C.

|  | $Ti^{4+}$ | $V^{4+}$ | $Nb^{5+}$ | $Ta^{5+}$ | $Cr^{3+}$ | $Mo^{6+}$ | $W^{6+}$ |
|---|---|---|---|---|---|---|---|
| $M(OH_2)_6$ | 0.0 | 0.0 | 0.0 | 0.0 | 6.0 | 0.0 | 0.0 |
| $M(OH)(OH_2)_5$ | 0.0 | 0.0 | 0.0 | 0.0 | 94.0 | 0.0 | 0.0 |
| $M(OH)_2(OH_2)_4$ | 0.4 | 0.0 | 0.0 | 0.0 | 0.0 | 0.0 | 0.0 |
| $MO(OH_2)_5$ | 0.1 | 99.8 | 0.0 | 0.0 | 0.0 | 0.0 | 0.0 |
| $M(OH)_3(OH_2)_3$ | 99.6 | 0.0 | 0.0 | 0.0 | 0.0 | 0.0 | 0.0 |
| $MO(OH)(OH_2)_4$ | — | 0.2 | 0.0 | 0.0 | — | 0.0 | — |
| $M(OH)_4(OH_2)_2$ | 0.0 | — | 100.0 | 100.0 | — | 0.0 | 0.0 |
| $MO(OH_2)_3$ | — | 0.0 | — | — | — | 0.0 | — |
| $MO_2(OH_2)_4$ | — | 0.0 | — | — | — | 0.0 | — |
| $M(OH)_5(OH_2)$ | — | — | 0.0 | 0.0 | — | 0.0 | 41.8 |
| $MO(OH)_3(OH_2)_2$ | — | — | — | — | — | 0.0 | — |
| $MO_2(OH)(OH_2)_3$ | — | — | — | — | — | 0.0 | — |

TABLE 1-continued

| | Ratio of Presence of Various Hydrated N Metal Ions (%) pH 2, 80° C. | | | | | | |
|---|---|---|---|---|---|---|---|
| | $Ti^{4+}$ | $V^{4+}$ | $Nb^{5+}$ | $Ta^{5+}$ | $Cr^{3+}$ | $Mo^{6+}$ | $W^{6+}$ |
| $M(OH)_6$ | — | — | — | — | — | 0.0 | 58.2 |
| $MO(OH)_4(OH_2)$ | — | — | — | — | — | 0.0 | — |
| $MO_2(OH)_2(OH_2)_2$ | — | — | — | — | — | 100.0 | — |
| $MO_3(OH_2)_3$ | — | — | — | — | — | 0.0 | — |

The V shown in Table 1 differs from Ti, Nb, Ta, Cr, Mo, W, and other transition metals in that it is clear that there are little OH groups in the stably present metal aqua ions in an acidic aqueous solution under the usage environment of solid polymer fuel cells.

FIG. 3(a) and FIG. 3(b) are schematic views of the case of using stainless steel separators or titanium separators having (a) conductive substance particles forming metal aqua ions having one or no OH groups (VB, $V_8C_7$, VN, etc.) and (b) conductive substance particles forming metal aqua ions having two or more OH groups (TiC, TiN, etc.) fixed to their surfaces in the usage environment of solid polymer fuel cells.

As shown in FIG. 3(a), conductive substances comprised of VB, $V_8C_7$, VN, etc. form metal (V) aqua ions not having OH groups in an acidic aqueous solution or form metal (V) aqua ions having at most one OH group. For this reason, no dehydrative condensation reaction of the metal (V) aqua ions occurs and no metal (V) oxides are formed.

On the other hand, as shown in FIG. 3(b), conductive substances comprised of TiC, TiN, etc. form metal (Ti) aqua ions having two or more OH groups in an acidic aqueous solution. Due to the dehydrative condensation reaction of the metal (Ti) aqua ions, the metal (Ti) oxides are formed.

From the above findings, in stainless steel separators and titanium or titanium alloy separators for solid polymer fuel cells, by selecting as the metal element forming the conductive substance particles fixed to the surface layer parts, for example, V or another metal where in an acidic aqueous solution envisioning the corrosive environment at the time of use of a fuel cell the stably formed metal aqua ions have at most one OH group, formation of metal oxides at the surfaces of the conductive substance particles at the time of use of fuel cells is prevented and deterioration of the electromotive force can be suppressed.

Here, if the average particle size of the conductive substance particles comprised of one or more of VB, $V_8C_7$, and VN is less than 0.01 micron, the effect of reduction of the contact resistance of the separator surface by the conductive substance particles cannot be sufficiently obtained and the low contact resistance aimed at for the solid polymer fuel cell separator cannot be obtained.

On the other hand, if the average particle size of the conductive substance particles is over 20 μm, when using the later explained firing particles comprised of conductive substance particles coated on surfaces of superhard core particles for blast treatment of a stainless steel surface layer part, titanium surface layer part, or titanium alloy surface layer part, the depth of burial of the conductive substance particles at the stainless steel surface layer part, titanium surface layer part, or titanium alloy surface layer part becomes small and as a result the density of the conductive substance particles at the surface layer part falls and the desired low contact resistance of the stainless steel base material, titanium base material, or titanium alloy base material can no longer be obtained. However, when using a method other than blast treatment to fix conductive substance particles to the stainless steel surface layer part or titanium surface layer part or titanium alloy surface layer part, there is no need to provide an upper limit of the average particle size of the conductive substance particles from the viewpoint of the contact resistance of the stainless steel surface, titanium surface, or titanium alloy surface.

From the above reasons, the average particle size of the conductive substance particles is 0.01 to 20 μm.

Further, the metal oxides formed on the surface layers of these conductive substance particles obstruct the action of the conductive substance particles in lowering the contact resistance of the separator surface. If the mass ratio of the metal oxides formed on the surface layers of the conductive substance particles to the particles as a whole is over 30%, the action of said conductive substance particles is remarkably obstructed and as a result the low contact resistance aimed at for the solid polymer fuel cell separator cannot be obtained.

From these reasons, the mass ratio of the metal oxides formed on the surface layers of these conductive substance particles to the particles as a whole was made 30% or less.

Note that the mass ratio of the metal oxides formed on the surface layers of these conductive substance particles to the particles as a whole may, for example, be measured as follows: First, a transmission type electron microscope is used to observe a cross-section of the conductive substance particles present at the stainless steel surface layer part, titanium surface layer part, or titanium alloy surface layer part, the areal ratio of the conductive substance particles as a whole and the surface layer part is measured, then the photoelectron spectroscopy method is used to quantify the molecules of the surface layer part of the conductive substance particles and the molecules of metal oxides present at the surface layer part, and the mass ratio of the metal oxides in the surface layer part to the conductive substance particles as a whole is found.

Further, the mass ratio of the metal oxides formed on the surface layer of the conductive substance particles to the particles as a whole may be adjusted by the later explained pickling treatment after blast treatment.

In the present invention, the surface of a stainless steel, titanium, or titanium alloy sheet is blasted with coated superhard particles comprised of superhard core particles coated with a low ion release substance to form a separator.

Next, the superhard core particles are comprised of a powder of a superhard substance bonded by sintering, but the specific gravity is large, so low speed (low pressure) firing is possible and the durability at the time of impact is good. In this point, it is preferable to use particles mainly comprised of WC. Further, usually, as the sintering binder, one containing at least one of Co, Cr, Ni, and Fe in a total of 1 mass % or more is used, so the superhard core particles contain at least one of Co, Cr, Ni, and Fe in a total of 1 mass % or more. Further, no upper limit is particularly provided, but 50 mass % or so may be illustrated.

Furthermore, having WC as the main ingredient means including WC in 50 mass % or more.

Further, the surfaces of the superhard core particles are coated with a conductive substance fine powder by light sintering using as a sintering binder one or more of Cu or Sn in a total of 1 mass % or more, so the coated layers of the superhard core particles include, in addition to the low ion release conductive substance, at least one or more of Cu and Sn in a total of 1 mass % or more. No upper limit is particularly provided for this as well, but 20 mass % or so may be mentioned.

Note that in the solid polymer fuel cell separator of the present invention, the amount of the conductive substance particles fixed to the separator surface layer part does not have to be particularly limited, but to sufficiently manifest the above-mentioned actions and effects of the conductive substance particles and reduce more the contact resistance of the separator surface, the number of the conductive substance particles per unit area at the separator surface layer part, that is, the density, is preferably $1\times10^8$ particles/cm$^2$ or more, more preferably $1\times10^{10}$ particles/cm$^2$ or more.

Next, the method of production for producing said solid polymer fuel cell separator will be explained below.

In the present invention, the stainless steel, titanium, or titanium alloy is shaped, then the low ion release conductive substance is fixed to the surface layer part by the method of blast treating the stainless steel surface layer part, titanium surface layer part, or titanium alloy surface layer part.

When the firing particles in the blast treatment are the above-mentioned low ion release conductive substance of an average particle size of 20 μm or less, however, among these, conductive substance particles comprised of metal elements forming metal aqua ions having only at most one OH group in an acidic aqueous solution such as one type of VB, $V_8C_7$, and VN, ones of 0.01 to 20 μm are used to make firing particles comprised of conductive substance particles coated on surfaces of superhard core particles.

Further, the lower limit of the average particle size of the conductive substance particles is not particularly an issue, but if the low ion release conductive substance is one of VB, $V_8C_7$, or VN, due to the reasons explained before, it is made 0.01 μm. On the other hand, regarding the upper limit of the average particle size of the conductive substance particles, if the average particle size is over 20 μm, if using firing particles comprised of conductive substance particles coated on surfaces of superhard core particles to blast treat a stainless steel surface layer part, titanium surface layer part, or titanium alloy surface layer part, the depth of burial of the conductive substance particles in the stainless steel surface layer part or titanium surface layer part becomes smaller and as a result the density of the conductive substance particles in the surface layer part falls and the desired low contact resistance of the stainless steel base material or titanium base material can no longer be obtained, so the size is made 20 μm.

Further, in firing particles comprised of conductive substance particles coated on surfaces of superhard core particles, the average particle size of the superhard core particles does not have any effect on the contact resistance of the separator surface obtained, so does not have to be limited from the viewpoint of the contact resistance.

However, if the average particle size of the superhard core particles becomes 200 μm or more, even if adjusting the firing pressure in the blast treatment, obtaining a flat separator shape becomes difficult, so to stably secure a flatness enabling the stacking required for a solid polymer fuel cell separator, the average particle size of the superhard core particles is preferably made less than 200 μm. More preferably, the average particle size of the superhard core particles should be made 100 μm or less.

Note that the hardness and the quality of the superhard core particles should be the hardness and quality used for usual blast treatment. For example, tungsten carbide etc. may be mentioned. Further, the firing particles comprised of said conductive substance particles coated on the surfaces of superhard core particles can be produced using the method of adding to and mixing with the conductive substance particles a binder comprised of, for example, one or more of Cu and Sn in an amount of 1 mass % or more and coating this on the surface of the superhard core particles.

Further, the firing pressure (impact energy) in the blast treatment does not affect the contact resistance of the obtained separator surface, so there is no need for limitation from the viewpoint of the contact resistance.

However, if the firing pressure is over 0.4 MPa, the amount of strain of the stainless steel surface layer part or titanium or titanium alloy surface layer part increases, the flatness of the separator shape deteriorates, and a good flatness is difficult to stably secure, so the upper limit of the firing pressure is preferably limited to 0.4 MPa or less. More preferably, the firing pressure is limited to 0.3 MPa or less. On the other hand, the lower limit of the firing pressure in the blast treatment should be in the range of firing pressure of the usual blast treatment and does not particularly have to be limited. If considering the work efficiency of the adjustment of the shape of the separator in the blast treatment etc., preferably it is 0.01 MPa or more.

In the present invention, as the method of fixing the conductive substance particles to a stainless steel surface layer part or titanium or titanium alloy surface layer part, the above blast treatment method is employed. By this blast treatment, the effect is obtained of enabling the contact resistance of the separator surface to be reduced in the above mentioned way. Further, the warp and twist in the C direction (direction vertical to rolling direction) occurring when rolling, press forming, or otherwise shaping stainless steel or titanium are reduced and the flatness of the separator shape can be improved.

Here, when the above-mentioned low ion release conductive substance is one or more of VN, $V_8C_7$, and VB, due to the above reasons, the mass ratio of the metal oxides formed at the surface layers of the conductive substance particles fixed to the surface layer part of the separator to the particles as a whole is made 30% or less by performing pickling treatment after the above-mentioned blast treatment. The conditions of the pickling treatment have to be a pH of 2 to 5 and a temperature of 40 to 80° C.

Under conditions of a pH at the time of pickling treatment of over 5, the action of removing the metal oxides formed at the surface layers of the conductive substance particles is not sufficient. On the other hand, under conditions of a pH of less than 2, the conductive substance particles themselves other than the metal oxides are eluted and reduced and the effect of reduction of the contact resistance of the separator surface due to the conductive substance particles falls, so the pH at the time of the pickling treatment was made 2 to 5.

Further, under conditions of a temperature of less than 40° C. at the time of the pickling treatment, the action of removal of the metal oxides formed at the surface layers of the conductive substance particles is not sufficient. On the other hand, under conditions where the temperature exceeds 80° C., the conductive substance particles themselves other than the metal oxides are eluted and reduced and the effect of reduction of the contact resistance of the separator surface due to the conductive substance particles is reduced, so the temperature of the pickling treatment was made 40 to 80° C.

Further, the time of the pickling treatment is not particularly limited, but from the viewpoint of the work efficiency of the pickling treatment, 1 hour or more is preferable. Further, the pickling solution used for the pickling treatment is also not particularly limited, but for example a sulfuric acid solution may be used and a blast treated separator immersed in a pickling tank.

By pickling treatment after the blast treatment of the separator surface, the metal oxides formed on the surface layers of the above-mentioned conductive substance particles are removed, the conductivity of the conductive substance particles is improved, and a low contact resistance of the separator surface targeted can be secured. Further, in addition to this effect, the effect of removal of the defects introduced at the surface of the conductive particles due to the blast treatment and suppression of ion release of the conductive particles at the time of use of the fuel cell is obtained.

By the above explained method of production of a solid polymer fuel cell separator of the present invention, it becomes possible to obtain a solid polymer fuel cell separator with a smaller contact resistance compared with the above-mentioned conventional separator and with suppressed deterioration of the low contact resistance in the usage environment of a solid polymer fuel cell.

Note that in the method of production of a solid polymer fuel cell separator of the present invention, the shaping of the stainless steel, titanium, or titanium alloy performed before the blast treatment is not particularly limited. For example, rolling, press forming, etc. may be used to form grooves of predetermined shapes and predetermined sizes at predetermined positions in a stainless steel sheet surface or titanium surface or titanium alloy forming the base material of the separator and thereby obtain a separator member having channels for hydrogen gas 8 or air 9 and water such as shown in FIG. 2.

At this time, the thickness of the stainless steel sheet or titanium or titanium alloy sheet used as the base material of the separator is not limited, but the thickness of the steel sheet actually used when producing a fixed fuel cell separator is 0.1 to 0.2 mm or so.

Further, as explained above, in general, the output voltage per solid polymer fuel cell is a low one of about 1V, so in practice, to obtain the desired output, a plurality of fuel cells are stacked for use as a stacked type fuel cell. For this reason, the separator obtained by shaping a stainless steel sheet or titanium sheet for a solid polymer fuel cell is required to have flatness with little warping or residual strain. In said rolling, press forming, or other shaping, warping occurs in the stainless steel sheet or titanium sheet after shaping mainly in the L direction (rolling direction) and the flatness of the separator shape is lost. In such a case, the L direction warping occurring in the separator after shaping can be eliminated by correction by rolling or force pressing the two sides along the L direction in the four peripheral flat parts of the separator. Below, this shape will be explained.

Note that the L direction (rolling direction) means the rolling direction in rolling of stainless steel, titanium, or a titanium alloy sheet. The rolling direction when shaping these sheets as separators by rolling is usually made the same as the rolling direction of the sheet. The "C direction" is a direction perpendicular to the L direction.

As the technology for low cost, high efficiency continuous shaping of a solid polymer type metal separator, for example, continuous shaping methods using the rolling technology disclosed in Japanese Patent Publication (A) No. 2002-313354, Japanese Patent Publication (A) No. 2002-190305, Japanese Patent Publication (A) No. 2002-75401, Japanese Patent Publication (A) No. 2004-220908, and Japanese Patent Publication (A) No. 2004-265855 have been invented. The bipolar metal separator illustrated in Japanese Patent Publication (A) No. 2002-25586 is verified as being able to be stably produced.

Therefore, the inventors have engaged in various studies up to now on the warping in the rolling direction (below, sometimes described as the L direction) which can occur at a separator in the working stage, whereby they found that the warping tends to be eliminated with correction by rolling or strongly pressing the two sides along the L direction among the four peripheral flat parts at the time of rolling or press forming. If rolling using feed roll described in Japanese Patent Publication (A) No. 2004-220908, the warping in the L direction can be effectively eliminated.

Further, the inventors discovered that if treating the conductive surface by the blast method, it is easy to control warping or twisting in the width direction (below, sometimes described as the C direction).

Therefore, the inventors used stainless steel, titanium, and titanium alloy comprised of extremely thin sheets of a thickness of 0.1 to 0.2 mm or so to shape metal separators, then mechanically buried conductive substances at part or all of the surfaces by the blast method without considering the balance (dispersed state) of internal stress of the separator, whereupon they ran up against the problem that the internal stress balance collapsed and major warping or twisting ends up occurring.

Therefore, to realize better flatness, it is necessary to suitably control the balance (dispersed state) of internal stress of the separator in the treatment by the blast method after shaping the metal separator.

Therefore, the inventors worked to realize even better flatness by combinations of the working and blast method.

As a result, they measured the shapes of the metal separators before treatment by the blast method (usually after shaping) and discovered by blast treating the projections of the corrugated parts of the recessed side of the warp as a whole stronger or longer than their back surfaces, they could control the balance (dispersed state) of internal stress of the separators and achieve better flatness.

As explained above, by using particles comprised of extremely small ion release conductive substances coated on superhard particles and making them strike a separator surface by a low firing pressure, it is possible to obtain a metal separator in the surface of which extremely small ion release conductive substances are buried and which has a flat shape.

Therefore, the surface of the part of the metal separator which is blast treated is formed with surface relief shapes, but the separator of the present invention is required to have a certain shape of the surface of the metal separator at the time of blast treatment for obtaining a flat shape.

Specifically, this is a surface shape satisfying an arithmetic mean roughness (Ra) of 0.5 to 5.0 μm, a 10-point mean roughness (Rz) of 3 to 20 μm, and an average spacing of surface relief shapes (Sm) of 300 μm or less.

This means that when the Ra value or the Rz value is less than the lower limit value, the blast treatment is not sufficient. The distribution of the internal stress of the separator could not be controlled and the shape could not be corrected well.

Further, when the Ra value or the Rz value exceeds the upper limit value, it means that the blast treatment is excessive. Since excessive internal stress is applied, conversely new warping or twisting occurs.

Furthermore, when the Sm value is over 300 μm, it shows that the internal stress ends up being locally concentrated. Local deformation is not allowed in terms of separator functions.

Note that these arithmetic mean roughness (Ra), 10-point mean roughness (Rz), and average spacing of surface relief shapes (Sm) can be measured by the methods provided in JIS B 0601.

Figure 4:
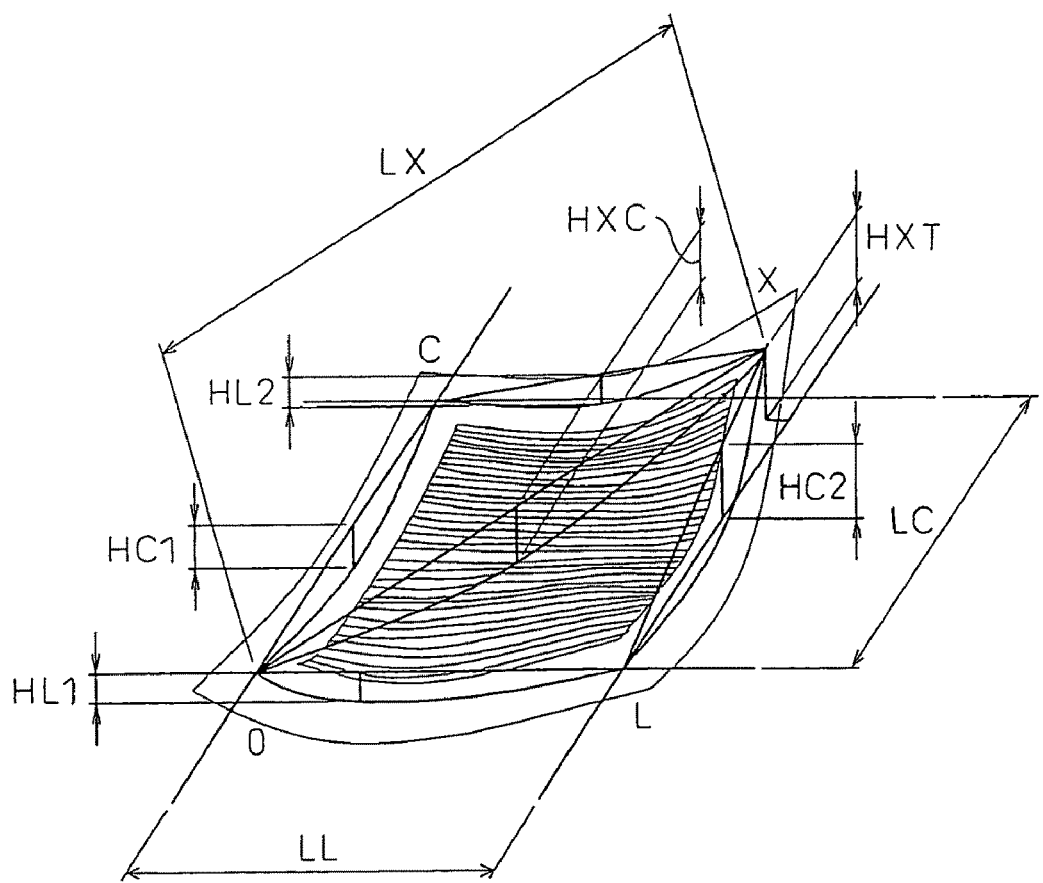
FIG. 4 is an explanatory view of indicators for evaluating the flatness of stainless steel, titanium, and titanium alloy separators for solid polymer fuel cells treated on the surface by conductive substances by the blast method.

Further, the metal separator of the present invention enables a flat shape to be obtained. However, there isn't any generalized standard on indicators for evaluation of the warp or twist of metal separators. Therefore, the inventors decided to use the parameters individually defined in FIG. 4 and create the warp rate (warp ratio) and twist rate (twist ratio) defined in equation <1> to equation <7> for evaluation.

That is, there are downward protruding warps, upward protruding warps, S-shaped warps, and various other warps.

In each case, the absolute value of the maximum value of the warp height is taken to create an indicator of the extent of warping by a positive real number value.

Further, the method of setting the points O, C, L, and X at the four corners of the metal separator may be any so long as there is a consistent rule in setting the distance from the ends, but here, as a general measure, intersection with lines drawn 10 mm inside from the four sides was made the standard.

As an example of the consistent rule, for example, the above four points are provided on the diagonal lines of a rectangular or square separator so as to become fixed lengths within 20% of the total lengths of the diagonals from the four corners. In the case of a circle or oval, it is sufficient to establish a rule for setting characteristic points in accordance with the shape.

The separator of the present invention is defined as having values of $W_{L1}$, $W_{L2}$, $W_{C1}$, $W_{C2}$, $W_{XC}$, $T_{XL}$, and $T_{XC}$, obtained by calculating the warp rate (warp ratio) and twist rate defined by the above equation <1> to equation <7>, of 0.1 or less:

$$\text{Front side } L \text{ direction warp rate: } W_{L1} = \frac{|HL1|}{LL} \quad <1>$$

$$\text{Back side } L \text{ direction warp rate: } W_{L2} = \frac{|HL2|}{LL} \quad <2>$$

$$\text{Left side } C \text{ direction warp rate: } W_{C1} = \frac{|HC1|}{LC} \quad <3>$$

$$\text{Right side } C \text{ direction warp rate: } W_{C2} = \frac{|HC2|}{LC} \quad <4>$$

$$\text{Diagonal direction warp rate: } W_{XC} = \frac{|HXC|}{LX} \quad <5>$$

$$L \text{ direction length reference twist rate: } T_{XL} = \frac{|HXT|}{LL} \quad <6>$$

$$C \text{ direction length reference twist rate: } T_{XC} = \frac{|HXT|}{LC} \quad <7>$$

Here, these values are stipulated as being 0.1 or less because this is the allowable range where even if there is this extent of warping or twisting, a fuel cell stack can be formed using the metal separators.

The closer these values to zero, the better the flatness and the easier the metal separator may be evaluated to stack. Further, if all are zero, the shape becomes ideal.

In practice, if all of the values of $W_{L1}$, $W_{L2}$, $W_{C1}$, $W_{C2}$, $W_{XC}$, $T_{XL}$, and $T_{XC}$ are 0.1 or less, it is possible to construct a relatively small fuel cell stack of about 10 layers without problem.

Furthermore, since the separator surface has a conductive substance with extremely small ion release buried in it, the contact resistance value with respect to carbon paper becomes 15 mΩcm² or less at a surface pressure of 1 MPa.

As a low ion release conductive substance, one including one or more of Au, WC, and WB and a balance of unavoidable impurities or one in including TaN mixed with one or more of WC and WB and a balance of unavoidable impurities is preferable.

Further, as the binder of the superhard core particles and low ion release conductive substance, one or more of Co, Cr, Ni, Fe, Cu, and Sn is included as unavoidable impurities at the surface of the solid polymer fuel cell separator.

These unavoidable impurities can be removed from the separator surface or reduced by pickling treatment as post-treatment.

As the method for evaluating the warping and twisting of a metal separator, a metal separator after surface treatment by the blast method is placed on a metal platen, its 3D shape is measured by a laser displacement meter, and the digitalized 3D displacement data is processed by a computer etc. to convert it to the values of equation <1> to equation <7>, and these values are used to judge if the warping and twisting of the separator are in the allowable ranges.

EXAMPLES

Below, examples will be used to explain the present invention in detail.

Example (1) to Example (20)

The means of the invention were used to treat stainless steel, titanium, or titanium alloy metal separators given surface relief shapes forming gas channels in 100 mm square regions and having flat parts at the four peripheries. Each material had an extremely thin sheet thickness of about 0.1 mm and is easily deformed by a relatively weak force. The stainless steel separators were shaped by rolling, while the titanium and titanium alloy separators were shaped by press forming.

Table 2 to Table 21 (Example (1) to Example (20)) also include comparative products. Examples of invention products of flat separators treated to become conductive by the blast method according to the invention of the present application are listed. By way of reference, the levels of inclusion of impurity elements in products of the present invention were all levels below the detection limit by electron beam energy spectroscopy.

As shown in these Table 2 to Table 21, the stainless steel, titanium, or titanium alloy separator for solid polymer fuel cells using the coated superhard particle blast method of Present Invention Nos. 4 to 59, Nos. 63 to 66, and Nos. 70 to 89 had warp rates and twist rates all of 0.1 or less, so it was learned that flat separators can be fabricated.

Further, as the surface roughness provision, the case where all points of the plurality of points (nine points or such as a general measure) of each surface of a separator satisfy an arithmetic mean roughness (Ra) of the surface of 0.5 to 5.0 μm, a 10-point mean roughness (Rz) of 3 to 20 μm, and an average spacing of surface relief shapes (Sm) of 300 μm or less is evaluated as "good", while the case where even one point deviates from this range is evaluated as "poor". Table 1 to Table 20 shows these as O: good, X: poor. As shown in these tables, the separators of the present invention all can satisfy the roughness provision.

Furthermore, it is learned that the contact resistance value with respect to carbon (contact resistance value with respect to carbon paper at surface pressure of 1 MPa) is 15 mΩcm² or less.

As opposed to this, Comparative Product Nos. 1 to 2 (stainless steel), Nos. 60 to 61 (titanium), and Nos. 67 to 68 (titanium alloy) have both warp rates and twist rates much larger than 0.1, so it is learned that flat separators cannot be fabricated.

Further, the Comparative Product No. 3, No. 62, and No. 69 are all gold plated products and not products like in the present invention where the blast method is used to bury low ion release conductive substances in the surfaces of the metal separators. The Comparative Product No. 3, No. 62, and No. 69 are gold plated products, so are greater in cost and therefore a lower cost as in the present invention cannot be realized.

Furthermore, the Comparative Product Nos. 1 to 3 (stainless steel), Nos. 60 to 62 (titanium), and Nos. 67 to 69 (titanium alloy) all do not satisfy the above roughness provision.

Note that for reference, Table 2 to Table 21 describe the ion release resistances and costs of the conductive substances along with the qualitative evaluation. In these, ⊚: very good O: good, Δ: fair, and X: poor.

As a general measure of the ion release resistance, an amount of metal ion release as a result of the above screening tests of 0.05 ppm or less is judged as "very good" and an amount of 20 ppm or less as "good". Further, the cost was evaluated qualitatively considered relative to usual prices.

From this list, combinations where both lower cost and durability can be achieved in the structure of a flat separator of the present invention can be understood.

Figure 5:
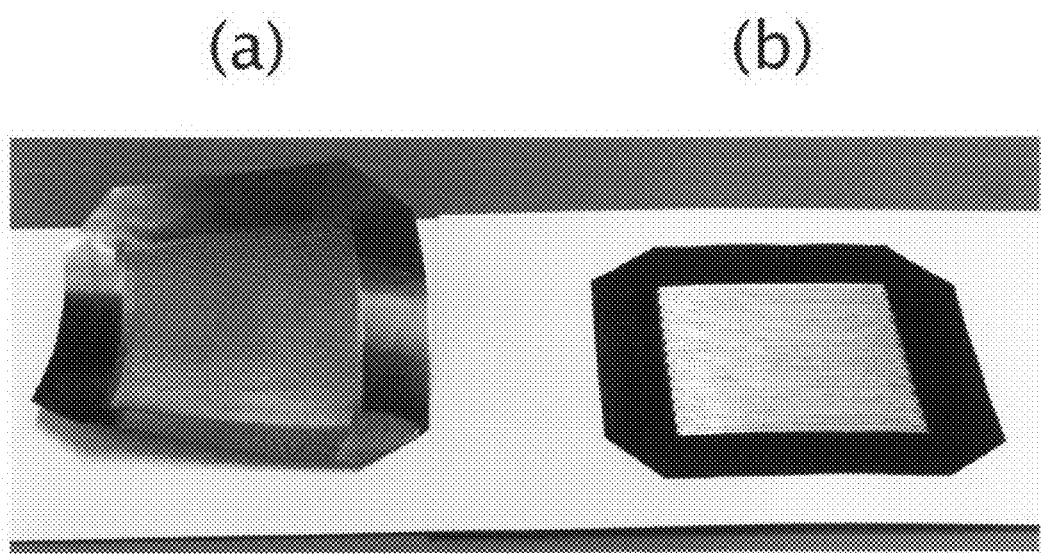
FIG. 5 gives views showing the state of deformation of a product in treatment by conductive surfaces using the blast method, wherein (a) shows the case by the prior art method while (b) shows the case by the present invention method.

Further, the photo of FIG. 5 shows, compared against each other, (a) a typical example of the state of deformation of a product occurring when firing conventional average particle size 200 μm superhard particles of WC by 0.5 MPa and (b) an example of the state of deformation of a flat separator product fabricated by firing average particle size 100μ superhard particles of WC to the front surface part by 0.06 to 0.08 MPa and to the back surface part by 0.04 MPa according to the method of the invention of the present application.

Here, the example of stainless steel given surface relief forming gas channels in a 100 mm square region and having flat parts at its four peripheries was shown, but the invention may also be applied to other shapes. For the material as well, any stainless steel, titanium, or titanium alloy material may be applied.

Further, commercially available MEAs were used to form fuel cells which were tested to verify long term power generation. For the materials, two types, high corrosion resistance stainless steel and titanium, were used. After treatment to give conductivity, the products were passivated by 30 mass % nitric acid to make the metal surfaces high in corrosion resistance. These were then used for power generation tests.

No remarkable drop in current value occurred in any of the invention products with a generated voltage of 0.6V after the elapse of 1000 hours.

TABLE 2

Example (1)

| Class | No. | Material | Working method | Buried conductive substance | Warp rate $W_{L1}$ | $W_{L2}$ | $W_{C1}$ | $W_{C2}$ | $W_{XC}$ |
|---|---|---|---|---|---|---|---|---|---|
| Comp. ex. | 1 | Stainless steel | Rolling | WC | 0.25 | 0.10 | 0.88 | 0.98 | 0.51 |
| Comp. ex. | 2 | Stainless steel | Rolling | WB | 0.20 | 0.23 | 0.72 | 0.82 | 0.62 |
| Comp. ex. | 3 | Stainless steel | Rolling | Au | 0.03 | 0.02 | 0.08 | 0.08 | 0.08 |
| Invention | 4 | Stainless steel | Rolling | Au | 0.01 | 0.02 | 0.08 | 0.09 | 0.10 |
| Invention | 5 | Stainless steel | Rolling | WC | 0.05 | 0.03 | 0.08 | 0.02 | 0.02 |
| Invention | 6 | Stainless steel | Rolling | WB | 0.04 | 0.03 | 0.07 | 0.06 | 0.06 |
| Invention | 7 | Stainless steel | Rolling | TaN | 0.01 | 0.03 | 0.05 | 0.08 | 0.05 |

| Class | No. | Twist rate $T_{XL}$ | $T_{XC}$ | Roughness provision | Contact resistance to carbon paper (mΩcm$^2$) | Ion release resistance | Conductive substance cost | Remarks |
|---|---|---|---|---|---|---|---|---|
| Comp. ex. | 1 | 0.82 | 0.73 | X | 38.5 | O | ⊚ | *1 |
| Comp. ex. | 2 | 0.71 | 0.62 | X | 26.5 | O | O | *2 |
| Comp. ex. | 3 | 0.03 | 0.02 | X | 3.9 | ⊚ | X | *3 |
| Invention | 4 | 0.08 | 0.09 | O | 5.6 | ⊚ | Δ | *4 |
| Invention | 5 | 0.05 | 0.09 | O | 8.5 | O | ⊚ | *5 |
| Invention | 6 | 0.08 | 0.09 | O | 11.2 | O | O | *6 |
| Invention | 7 | 0.08 | 0.05 | O | 12.3 | ⊚ | O | *7 |

TABLE 3

Example (2)

| Class | No. | Material | Working method | Buried conductive substance | Warp rate $W_{L1}$ | $W_{L2}$ | $W_{C1}$ | $W_{C2}$ | $W_{XC}$ |
|---|---|---|---|---|---|---|---|---|---|
| Invention | 8 | Stainless steel | Rolling | Au: 1.0 mass % WC: 99.0 mass % | 0.03 | 0.02 | 0.01 | 0.02 | 0.01 |
| Invention | 9 | Stainless steel | Rolling | Au: 10.0 mass % WC: 90.0 mass % | 0.02 | 0.01 | 0.02 | 0.02 | 0.01 |
| Invention | 10 | Stainless steel | Rolling | Au: 30.0 mass % WC: 70.0 mass % | 0.01 | 0.01 | 0.02 | 0.02 | 0.02 |
| Invention | 11 | Stainless steel | Rolling | Au: 50.0 mass % WC: 50.0 mass % | 0 | 0.01 | 0.02 | 0.03 | 0.02 |

TABLE 3-continued

Example (2)

| Class | No. | Twist rate $T_{XL}$ | Twist rate $T_{XC}$ | Roughness provision | Contact resistance to carbon paper (mΩcm$^2$) | Ion release resistance | Conductive substance cost | Remarks |
|---|---|---|---|---|---|---|---|---|
| Invention | 8 | 0.01 | 0.01 | ○ | 7.8 | ○ | ⊚ | *8 |
| Invention | 9 | 0.01 | 0.02 | ○ | 6.7 | ○ | ○ | *9 |
| Invention | 10 | 0.01 | 0.02 | ○ | 5.8 | ○ | Δ | *10 |
| Invention | 11 | 0.01 | 0.03 | ○ | 5.8 | ○ | Δ | *11 |

TABLE 4

Example (3)

| Class | No. | Material | Working method | Buried conductive substance | $W_{L1}$ | $W_{L2}$ | $W_{C1}$ | $W_{C2}$ | $W_{XC}$ |
|---|---|---|---|---|---|---|---|---|---|
| Invention | 12 | Stainless steel | Rolling | WC: 99.0 mass % WB: 1.0 mass % | 0.03 | 0.02 | 0.01 | 0.02 | 0.01 |
| Invention | 13 | Stainless steel | Rolling | WC: 90.0 mass % WB: 10.0 mass % | 0.03 | 0.02 | 0.01 | 0.02 | 0.03 |
| Invention | 14 | Stainless steel | Rolling | WC: 70.0 mass % WB: 30.0 mass % | 0.03 | 0.02 | 0.01 | 0.01 | 0.03 |
| Invention | 15 | Stainless steel | Rolling | WC: 50.0 mass % WB: 50.0 mass % | 0.03 | 0.02 | 0.01 | 0.01 | 0.03 |

| Class | No. | Twist rate $T_{XL}$ | Twist rate $T_{XC}$ | Roughness provision | Contact resistance to carbon paper (mΩcm$^2$) | Ion release resistance | Conductive substance cost | Remarks |
|---|---|---|---|---|---|---|---|---|
| Invention | 12 | 0.01 | 0.01 | ○ | 7.8 | ○ | ⊚ | *12 |
| Invention | 13 | 0.02 | 0.03 | ○ | 7.9 | ○ | ⊚ | *13 |
| Invention | 14 | 0.02 | 0.01 | ○ | 7.6 | ○ | ⊚ | *14 |
| Invention | 15 | 0.01 | 0.02 | ○ | 7.5 | ○ | ⊚ | *15 |

TABLE 5

Example (4)

| Class | No. | Material | Working method | Buried conductive substance | $W_{L1}$ | $W_{L2}$ | $W_{C1}$ | $W_{C2}$ | $W_{XC}$ |
|---|---|---|---|---|---|---|---|---|---|
| Invention | 16 | Stainless steel | Rolling | WB: 99.0 mass % Au: 1.0 mass % | 0.03 | 0.02 | 0.01 | 0.02 | 0.01 |
| Invention | 17 | Stainless steel | Rolling | WB: 90.0 mass % Au: 10.0 mass % | 0.03 | 0.02 | 0.01 | 0.01 | 0.01 |
| Invention | 18 | Stainless steel | Rolling | WB: 70.0 mass % Au: 30.0 mass % | 0.03 | 0.02 | 0.01 | 0.02 | 0.01 |
| Invention | 19 | Stainless steel | Rolling | WB: 50.0 mass % Au: 50.0 mass % | 0.03 | 0.02 | 0.01 | 0.01 | 0.01 |

| Class | No. | Twist rate $T_{XL}$ | Twist rate $T_{XC}$ | Roughness provision | Contact resistance to carbon paper (mΩcm$^2$) | Ion release resistance | Conductive substance cost | Remarks |
|---|---|---|---|---|---|---|---|---|
| Invention | 16 | 0.01 | 0.01 | ○ | 8.5 | ○ | ○ | *16 |
| Invention | 17 | 0.01 | 0.01 | ○ | 8.2 | ○ | ○ | *17 |
| Invention | 18 | 0.01 | 0.01 | ○ | 7.9 | ○ | Δ | *18 |
| Invention | 19 | 0.01 | 0.01 | ○ | 6.5 | ○ | Δ | *19 |

TABLE 6

Example (5)

| Class | No. | Material | Working method | Buried conductive substance | Warp rate | | | | |
|---|---|---|---|---|---|---|---|---|---|
| | | | | | $W_{L1}$ | $W_{L2}$ | $W_{C1}$ | $W_{C2}$ | $W_{XC}$ |
| Invention | 20 | Stainless steel | Rolling | TaN: 0.02 mass % WC: 99.98 mass % | 0.01 | 0.02 | 0.01 | 0.01 | 0.02 |
| Invention | 21 | Stainless steel | Rolling | TaN: 0.1 mass % WC: 99.9 mass % | 0.01 | 0.02 | 0.01 | 0.02 | 0.02 |
| Invention | 22 | Stainless steel | Rolling | TaN: 1.0 mass % WC: 99.0 mass % | 0.01 | 0.02 | 0.01 | 0.01 | 0.02 |
| Invention | 23 | Stainless steel | Rolling | TaN: 10.0 mass % WC: 90.0 mass % | 0.01 | 0.02 | 0.01 | 0.02 | 0.01 |

| Class | No. | Twist rate | | Roughness provision | Contact resistance to carbon paper (mΩcm²) | Ion release resistance | Conductive substance cost | Remarks |
|---|---|---|---|---|---|---|---|---|
| | | $T_{XL}$ | $T_{XC}$ | | | | | |
| Invention | 20 | 0.01 | 0.01 | ○ | 7.5 | ◎ | ◎ | *20 |
| Invention | 21 | 0.01 | 0.01 | ○ | 6.5 | ◎ | ◎ | *21 |
| Invention | 22 | 0.01 | 0.01 | ○ | 5.5 | ◎ | ◎ | *22 |
| Invention | 23 | 0.01 | 0.01 | ○ | 6.9 | ◎ | ◎ | *23 |

TABLE 7

Example (6)

| Class | No. | Material | Working method | Buried conductive substance | Warp rate | | | | |
|---|---|---|---|---|---|---|---|---|---|
| | | | | | $W_{L1}$ | $W_{L2}$ | $W_{C1}$ | $W_{C2}$ | $W_{XC}$ |
| Invention | 24 | Stainless steel | Rolling | TaN: 20.0 mass % WC: 80.0 mass % | 0.01 | 0.02 | 0.01 | 0.01 | 0.02 |
| Invention | 25 | Stainless steel | Rolling | TaN: 30.0 mass % WC: 70.0 mass % | 0.01 | 0.01 | 0.01 | 0.01 | 0.01 |
| Invention | 26 | Stainless steel | Rolling | TaN: 40.0 mass % WC: 60.0 mass % | 0.01 | 0.02 | 0.01 | 0.02 | 0.01 |
| Invention | 27 | Stainless steel | Rolling | TaN: 50.0 mass % WC: 50.0 mass % | 0.01 | 0.01 | 0.01 | 0.01 | 0.02 |

| Class | No. | Twist rate | | Roughness provision | Contact resistance to carbon paper (mΩcm²) | Ion release resistance | Conductive substance cost | Remarks |
|---|---|---|---|---|---|---|---|---|
| | | $T_{XL}$ | $T_{XC}$ | | | | | |
| Invention | 24 | 0.01 | 0.01 | ○ | 6.5 | ◎ | ◎ | *24 |
| Invention | 25 | 0.01 | 0.01 | ○ | 5.9 | ◎ | ◎ | *25 |
| Invention | 26 | 0.01 | 0.01 | ○ | 9.8 | ◎ | ◎ | *26 |
| Invention | 27 | 0.01 | 0.01 | ○ | 11 | ◎ | ○ | *27 |

TABLE 8

Example (7)

| Class | No. | Material | Working method | Buried conductive substance | Warp rate | | | | |
|---|---|---|---|---|---|---|---|---|---|
| | | | | | $W_{L2}$ | $W_{L2}$ | $W_{C1}$ | $W_{C2}$ | $W_{XC}$ |
| Invention | 28 | Stainless steel | Rolling | TaN: 0.02 mass % WB: 99.98 mass % | 0.01 | 0.02 | 0.01 | 0.01 | 0.02 |
| Invention | 29 | Stainless steel | Rolling | TaN: 0.1 mass % WB: 99.9 mass % | 0.01 | 0.02 | 0.01 | 0.02 | 0.01 |
| Invention | 30 | Stainless steel | Rolling | TaN: 1.0 mass % WB: 99.0 mass % | 0.01 | 0.01 | 0.01 | 0.02 | 0.01 |
| Invention | 31 | Stainless steel | Rolling | TaN: 10.0 mass % WB: 90.0 mass % | 0.01 | 0.02 | 0.01 | 0.01 | 0.01 |

TABLE 8-continued

Example (7)

| Class | No. | Twist rate $T_{XL}$ | Twist rate $T_{XC}$ | Roughness provision | Contact resistance to carbon paper (mΩcm²) | Ion release resistance | Conductive substance cost | Remarks |
|---|---|---|---|---|---|---|---|---|
| Invention | 28 | 0.01 | 0.01 | ◯ | 8.5 | ◉ | ◯ | *28 |
| Invention | 29 | 0.01 | 0.01 | ◯ | 9.5 | ◉ | ◯ | *29 |
| Invention | 30 | 0.01 | 0.01 | ◯ | 10.2 | ◉ | ◯ | *30 |
| Invention | 31 | 0.01 | 0.01 | ◯ | 11.2 | ◉ | ◯ | *31 |

TABLE 9

Example (8)

| Class | No. | Material | Working method | Buried conductive substance | Warp rate $W_{L1}$ | $W_{L2}$ | $W_{C1}$ | $W_{C2}$ | $W_{XC}$ |
|---|---|---|---|---|---|---|---|---|---|
| Invention | 32 | Stainless steel | Rolling | TaN: 20.0 mass % WB: 80.0 mass % | 0.01 | 0.02 | 0.01 | 0.02 | 0.02 |
| Invention | 33 | Stainless steel | Rolling | TaN: 30.0 mass % WB: 70.0 mass % | 0.01 | 0.02 | 0.01 | 0.02 | 0.02 |
| Invention | 34 | Stainless steel | Rolling | TaN: 40.0 mass % WB: 60.0 mass % | 0.01 | 0.02 | 0.01 | 0.02 | 0.02 |
| Invention | 35 | Stainless steel | Rolling | TaN: 50.0 mass % WB: 50.0 mass % | 0.01 | 0.02 | 0.01 | 0.02 | 0.02 |

| Class | No. | Twist rate $T_{XL}$ | Twist rate $T_{XC}$ | Roughness provision | Contact resistance to carbon paper (mΩcm²) | Ion release resistance | Conductive substance cost | Remarks |
|---|---|---|---|---|---|---|---|---|
| Invention | 32 | 0.01 | 0.01 | ◯ | 11.5 | ◉ | ◯ | *32 |
| Invention | 33 | 0.01 | 0.01 | ◯ | 12.5 | ◉ | ◯ | *33 |
| Invention | 34 | 0.01 | 0.01 | ◯ | 14.2 | ◉ | ◯ | *34 |
| Invention | 35 | 0.01 | 0.01 | ◯ | 13.2 | ◉ | ◯ | *35 |

TABLE 10

Example (9)

| Class | No. | Material | Working method | Buried conductive substance | Warp rate $W_{L1}$ | $W_{L2}$ | $W_{C1}$ | $W_{C2}$ | $W_{XC}$ |
|---|---|---|---|---|---|---|---|---|---|
| Invention | 36 | Stainless steel | Rolling | TaN: 0.02 mass % WB: 9.98 mass % WC: 90.00 mass % | 0.01 | 0.02 | 0.01 | 0.01 | 0.02 |
| Invention | 37 | Stainless steel | Rolling | TaN: 0.02 mass % WB: 19.98 mass % WC: 80.00 mass % | 0.01 | 0.02 | 0.01 | 0.02 | 0.01 |
| Invention | 38 | Stainless steel | Rolling | TaN: 0.02 mass % WB: 49.98 mass % WC: 50.00 mass % | 0.01 | 0.01 | 0.01 | 0.02 | 0.01 |
| Invention | 39 | Stainless steel | Rolling | TaN: 0.02 mass % WB: 89.98 mass % WC: 10.00 mass % | 0.01 | 0.02 | 0.01 | 0.01 | 0.01 |

| Class | No. | Twist rate $T_{XL}$ | Twist rate $T_{XC}$ | Roughness provision | Contact resistance to carbon paper (mΩcm²) | Ion release resistance | Conductive substance cost | Remarks |
|---|---|---|---|---|---|---|---|---|
| Invention | 36 | 0.01 | 0.01 | ◯ | 11.2 | ◉ | ◉ | *36 |
| Invention | 37 | 0.01 | 0.01 | ◯ | 12.6 | ◉ | ◉ | *37 |

TABLE 10-continued

Example (9)

| Class | No. | | | | | | | |
|---|---|---|---|---|---|---|---|---|
| Invention | 38 | 0.01 | 0.01 | ◯ | 10.2 | ⊚ | ⊚ | *38 |
| Invention | 39 | 0.01 | 0.01 | ◯ | 9.5 | ⊚ | ◯ | *39 |

TABLE 11

Example (10)

| Class | No. | Material | Working method | Buried conductive substance | Warp rate | | | | |
|---|---|---|---|---|---|---|---|---|---|
| | | | | | $W_{L1}$ | $W_{L2}$ | $W_{C1}$ | $W_{C2}$ | $W_{XC}$ |
| Invention | 40 | Stainless steel | Rolling | TaN: 0.1 mass %<br>WB: 9.9 mass %<br>WC: 90.0 mass % | 0.01 | 0.02 | 0.01 | 0.02 | 0.02 |
| Invention | 41 | Stainless steel | Rolling | TaN: 0.1 mass %<br>WB: 19.9 mass %<br>WC: 80.0 mass % | 0.01 | 0.02 | 0.01 | 0.02 | 0.02 |
| Invention | 42 | Stainless steel | Rolling | TaN: 0.1 mass %<br>WB: 49.9 mass %<br>WC: 50.0 mass % | 0.01 | 0.02 | 0.01 | 0.02 | 0.02 |
| Invention | 43 | Stainless steel | Rolling | TaN: 0.1 mass %<br>WB: 89.9 mass %<br>WC: 10.0 mass % | 0.01 | 0.02 | 0.01 | 0.02 | 0.02 |

| Class | No. | Twist rate | | Roughness provision | Contact resistance to carbon paper (mΩcm²) | Ion release resistance | Conductive substance cost | Remarks |
|---|---|---|---|---|---|---|---|---|
| | | $T_{XL}$ | $T_{XC}$ | | | | | |
| Invention | 40 | 0.01 | 0.01 | ◯ | 8.5 | ⊚ | ⊚ | *40 |
| Invention | 41 | 0.01 | 0.01 | ◯ | 12.5 | ⊚ | ⊚ | *41 |
| Invention | 42 | 0.01 | 0.01 | ◯ | 14.2 | ⊚ | ⊚ | *42 |
| Invention | 43 | 0.01 | 0.01 | ◯ | 13.2 | ⊚ | ◯ | *43 |

TABLE 12

Example (11)

| Class | No. | Material | Working method | Buried conductive substance | Warp rate | | | | |
|---|---|---|---|---|---|---|---|---|---|
| | | | | | $W_{L1}$ | $W_{L2}$ | $W_{C1}$ | $W_{C2}$ | $W_{XC}$ |
| Invention | 44 | Stainless steel | Rolling | TaN: 1.0 mass %<br>WB: 9.0 mass %<br>WC: 90.0 mass % | 0.01 | 0.02 | 0.01 | 0.01 | 0.02 |
| Invention | 45 | Stainless steel | Rolling | TaN: 1.0 mass %<br>WB: 19.0 mass %<br>WC: 80.00 mass % | 0.01 | 0.02 | 0.01 | 0.02 | 0.01 |
| Invention | 46 | Stainless steel | Rolling | TaN: 1.0 mass %<br>WB: 49.0 mass %<br>WC: 50.0 mass % | 0.01 | 0.01 | 0.01 | 0.02 | 0.01 |
| Invention | 47 | Stainless steel | Rolling | TaN: 0.1 mass %<br>WB: 89.0 mass %<br>WC: 10.0 mass % | 0.01 | 0.02 | 0.01 | 0.01 | 0.01 |

| Class | No. | Twist rate | | Roughness provision | Contact resistance to carbon paper (mΩcm²) | Ion release resistance | Conductive substance cost | Remarks |
|---|---|---|---|---|---|---|---|---|
| | | $T_{XL}$ | $T_{XC}$ | | | | | |
| Invention | 44 | 0.01 | 0.01 | ◯ | 8.5 | ⊚ | ⊚ | *44 |
| Invention | 45 | 0.01 | 0.01 | ◯ | 9.5 | ⊚ | ⊚ | *45 |
| Invention | 46 | 0.01 | 0.01 | ◯ | 10.2 | ⊚ | ⊚ | *46 |
| Invention | 47 | 0.01 | 0.01 | ◯ | 11.2 | ⊚ | ◯ | *47 |

TABLE 13

Example (12)

| Class | No. | Material | Working method | Buried conductive substance | Warp rate | | | | |
|---|---|---|---|---|---|---|---|---|---|
| | | | | | $W_{L1}$ | $W_{L2}$ | $W_{C1}$ | $W_{C2}$ | $W_{XC}$ |
| Invention | 48 | Stainless steel | Rolling | TaN: 5.0 mass % WB: 7.5 mass % WC: 87.5 mass % | 0.01 | 0.02 | 0.01 | 0.02 | 0.02 |
| Invention | 49 | Stainless steel | Rolling | TaN: 5.0 mass % WB: 17.5 mass % WC: 77.5 mass % | 0.01 | 0.02 | 0.01 | 0.02 | 0.02 |
| Invention | 50 | Stainless steel | Rolling | TaN: 5.0 mass % WB: 47.5 mass % WC: 47.5 mass % | 0.01 | 0.02 | 0.01 | 0.02 | 0.02 |
| Invention | 51 | Stainless steel | Rolling | TaN: 5.0 mass % WB: 87.5 mass % WC: 7.5 mass % | 0.01 | 0.02 | 0.01 | 0.02 | 0.02 |

| Class | No. | Twist rate | | Roughness provision | Contact resistance to carbon paper ($m\Omega cm^2$) | Ion release resistance | Conductive substance cost | Remarks |
|---|---|---|---|---|---|---|---|---|
| | | $T_{XL}$ | $T_{XC}$ | | | | | |
| Invention | 48 | 0.01 | 0.01 | ○ | 11.5 | ◉ | ◉ | *48 |
| Invention | 49 | 0.01 | 0.01 | ○ | 8.9 | ◉ | ◉ | *49 |
| Invention | 50 | 0.01 | 0.01 | ○ | 14.2 | ◉ | ◉ | *50 |
| Invention | 51 | 0.01 | 0.01 | ○ | 13.2 | ◉ | ○ | *51 |

TABLE 14

Example (13)

| Class | No. | Material | Working method | Buried conductive substance | Warp rate | | | | |
|---|---|---|---|---|---|---|---|---|---|
| | | | | | $W_{L1}$ | $W_{L2}$ | $W_{C1}$ | $W_{C2}$ | $W_{XC}$ |
| Invention | 52 | Stainless steel | Rolling | TaN: 10.0 mass % WB: 10.0 mass % WC: 80.0 mass % | 0.01 | 0.02 | 0.01 | 0.01 | 0.02 |
| Invention | 53 | Stainless steel | Rolling | TaN: 10.0 mass % WB: 20.0 mass % WC: 70.0 mass % | 0.01 | 0.02 | 0.01 | 0.02 | 0.01 |
| Invention | 54 | Stainless steel | Rolling | TaN: 10.0 mass % WB: 45.0 mass % WC: 45.0 mass % | 0.01 | 0.01 | 0.01 | 0.02 | 0.01 |
| Invention | 55 | Stainless steel | Rolling | TaN: 10.0 mass % WB: 80.0 mass % WC: 10.0 mass % | 0.01 | 0.02 | 0.01 | 0.01 | 0.01 |

| Class | No. | Twist rate | | Roughness provision | Contact resistance to carbon paper ($m\Omega cm^2$) | Ion release resistance | Conductive substance cost | Remarks |
|---|---|---|---|---|---|---|---|---|
| | | $T_{XL}$ | $T_{XC}$ | | | | | |
| Invention | 52 | 0.01 | 0.01 | ○ | 8.5 | ◉ | ◉ | *52 |
| Invention | 53 | 0.01 | 0.01 | ○ | 9.5 | ◉ | ◉ | *53 |
| Invention | 54 | 0.01 | 0.01 | ○ | 9.8 | ◉ | ◉ | *54 |
| Invention | 55 | 0.01 | 0.01 | ○ | 11.2 | ◉ | ○ | *55 |

TABLE 15

Example (14)

| Class | No. | Material | Working method | Buried conductive substance | Warp rate | | | | |
|---|---|---|---|---|---|---|---|---|---|
| | | | | | $W_{L1}$ | $W_{L2}$ | $W_{C1}$ | $W_{C2}$ | $W_{XC}$ |
| Invention | 56 | Stainless steel | Rolling | TaN: 30.0 mass % WB: 5.0 mass % WC: 65.0 mass % | 0.01 | 0.02 | 0.01 | 0.02 | 0.02 |

TABLE 15-continued

Example (14)

| Class | No. | Material | Working method | Buried conductive substance | $W_{L1}$ | $W_{L2}$ | $W_{C1}$ | $W_{C2}$ | $W_{XC}$ |
|---|---|---|---|---|---|---|---|---|---|
| Invention | 57 | Stainless steel | Rolling | TaN: 30.0 mass %<br>WB: 30.0 mass %<br>WC: 40.0 mass % | 0.01 | 0.02 | 0.01 | 0.02 | 0.02 |
| Invention | 58 | Stainless steel | Rolling | TaN: 30.0 mass %<br>WB: 40.0 mass %<br>WC: 30.0 mass % | 0.01 | 0.02 | 0.01 | 0.02 | 0.02 |
| Invention | 59 | Stainless steel | Rolling | TaN: 30.0 mass %<br>WB: 60.0 mass %<br>WC: 10.0 mass % | 0.01 | 0.02 | 0.01 | 0.02 | 0.02 |

| Class | No. | Twist rate $T_{XL}$ | Twist rate $T_{XC}$ | Roughness provision | Contact resistance to carbon paper (mΩcm²) | Ion release resistance | Conductive substance cost | Remarks |
|---|---|---|---|---|---|---|---|---|
| Invention | 56 | 0.01 | 0.01 | ○ | 11.5 | ◎ | ○ | *56 |
| Invention | 57 | 0.01 | 0.01 | ○ | 12.5 | ◎ | ○ | *57 |
| Invention | 58 | 0.01 | 0.01 | ○ | 14.2 | ◎ | ○ | *58 |
| Invention | 59 | 0.01 | 0.01 | ○ | 13.2 | ◎ | ○ | *59 |

TABLE 16

Example (15)

| Class | No. | Material | Working method | Buried conductive substance | $W_{L1}$ | $W_{L2}$ | $W_{C1}$ | $W_{C2}$ | $W_{XC}$ |
|---|---|---|---|---|---|---|---|---|---|
| Comp. ex. | 60 | Titanium | Pressing | WC | 0.25 | 0.10 | 0.88 | 0.98 | 0.51 |
| Comp. ex. | 61 | Titanium | Pressing | WB | 0.20 | 0.23 | 0.72 | 0.82 | 0.62 |
| Comp. ex. | 62 | Titanium | Pressing | Au | 0.03 | 0.02 | 0.08 | 0.08 | 0.08 |
| Invention | 63 | Titanium | Pressing | Au | 0.01 | 0.02 | 0.08 | 0.09 | 0.10 |
| Invention | 64 | Titanium | Pressing | WC | 0.05 | 0.03 | 0.08 | 0.02 | 0.02 |
| Invention | 65 | Titanium | Pressing | WB | 0.04 | 0.03 | 0.07 | 0.06 | 0.06 |
| Invention | 66 | Titanium | Pressing | TaN | 0.01 | 0.03 | 0.05 | 0.08 | 0.05 |

| Class | No. | Twist rate $T_{XL}$ | Twist rate $T_{XC}$ | Roughness provision | Contact resistance to carbon paper (mΩcm²) | Ion release resistance | Conductive substance cost | Remarks |
|---|---|---|---|---|---|---|---|---|
| Comp. ex. | 60 | 0.82 | 0.73 | X | 38.5 | ○ | ◎ | *60 |
| Comp. ex. | 61 | 0.71 | 0.62 | X | 26.5 | ○ | ○ | *61 |
| Comp. ex. | 62 | 0.03 | 0.02 | X | 3.9 | ◎ | X | *62 |
| Invention | 63 | 0.08 | 0.09 | ○ | 5.6 | ◎ | Δ | *63 |
| Invention | 64 | 0.05 | 0.09 | ○ | 8.5 | ○ | ◎ | *64 |
| Invention | 65 | 0.08 | 0.09 | ○ | 11.2 | ○ | ○ | *65 |
| Invention | 66 | 0.08 | 0.05 | ○ | 12.3 | ◎ | ○ | *66 |

TABLE 17

Example (16)

| Class | No. | Material | Working method | Buried conductive substance | $W_{L1}$ | $W_{L2}$ | $W_{C1}$ | $W_{C2}$ | $W_{XC}$ |
|---|---|---|---|---|---|---|---|---|---|
| Comp. ex. | 67 | Titanium alloy 6%Al—4%V | Pressing | WC | 0.25 | 0.10 | 0.88 | 0.98 | 0.51 |
| Comp. ex. | 68 | Titanium alloy 6%Al—4%V | Pressing | WB | 0.20 | 0.23 | 0.72 | 0.82 | 0.62 |
| Comp. ex. | 69 | Titanium alloy 6%Al—4%V | Pressing | Au | 0.03 | 0.02 | 0.08 | 0.08 | 0.08 |
| Invention | 70 | Titanium alloy 6%Al—4%V | Pressing | Au | 0.01 | 0.02 | 0.08 | 0.09 | 0.10 |
| Invention | 71 | Titanium alloy 6%Al—4%V | Pressing | WC | 0.05 | 0.03 | 0.08 | 0.02 | 0.02 |
| Invention | 72 | Titanium alloy 6%Al—4%V | Pressing | WB | 0.04 | 0.03 | 0.07 | 0.06 | 0.06 |

TABLE 17-continued

Example (16)

| Class | No. | Material | Working method | Buried conductive substance | | | | | |
|---|---|---|---|---|---|---|---|---|---|
| Invention | 73 | Titanium alloy 6%Al—4%V | Pressing | TaN | 0.01 | 0.03 | 0.05 | 0.08 | 0.05 |

| Class | No. | Twist rate $T_{XL}$ | $T_{XC}$ | Roughness provision | Contact resistance to carbon paper (mΩcm²) | Ion release resistance | Conductive substance cost | Remarks |
|---|---|---|---|---|---|---|---|---|
| Comp. ex. | 67 | 0.82 | 0.73 | X | 38.5 | ○ | ◎ | *67 |
| Comp. ex. | 68 | 0.71 | 0.62 | X | 26.5 | ○ | ○ | *68 |
| Comp. ex. | 69 | 0.03 | 0.02 | X | 3.9 | ◎ | X | *69 |
| Invention | 70 | 0.08 | 0.09 | ○ | 5.6 | ◎ | Δ | *70 |
| Invention | 71 | 0.05 | 0.09 | ○ | 8.5 | ○ | ◎ | *71 |
| Invention | 72 | 0.08 | 0.09 | ○ | 11.2 | ○ | ○ | *72 |
| Invention | 73 | 0.08 | 0.05 | ○ | 12.3 | ◎ | ○ | *73 |

TABLE 18

Example (17)

| Class | No. | Material | Working method | Buried conductive substance | Warp rate $W_{L2}$ | $W_{L2}$ | $W_{C1}$ | $W_{C2}$ | $W_{XC}$ |
|---|---|---|---|---|---|---|---|---|---|
| Invention | 74 | Titanium | Pressing | TaN: 0.02 mass % WC: 99.98 mass % | 0.01 | 0.02 | 0.01 | 0.01 | 0.02 |
| Invention | 75 | Titanium | Pressing | TaN: 0.1 mass % WC: 99.9 mass % | 0.01 | 0.02 | 0.01 | 0.02 | 0.02 |
| Invention | 76 | Titanium | Pressing | TaN: 1.0 mass % WC: 99.0 mass % | 0.01 | 0.02 | 0.01 | 0.01 | 0.02 |
| Invention | 77 | Titanium | Pressing | TaN: 10.0 mass % WC: 90.0 mass % | 0.01 | 0.02 | 0.01 | 0.02 | 0.01 |

| Class | No. | Twist rate $T_{XL}$ | $T_{XC}$ | Roughness provision | Contact resistance to carbon paper (mΩcm²) | Ion release resistance | Conductive substance cost | Remarks |
|---|---|---|---|---|---|---|---|---|
| Invention | 74 | 0.01 | 0.01 | ○ | 7.5 | ◎ | ◎ | *74 |
| Invention | 75 | 0.01 | 0.01 | ○ | 6.5 | ◎ | ◎ | *75 |
| Invention | 76 | 0.01 | 0.01 | ○ | 5.5 | ◎ | ◎ | *76 |
| Invention | 77 | 0.01 | 0.01 | ○ | 6.9 | ◎ | ◎ | *77 |

TABLE 19

Example (18)

| Class | No. | Material | Working method | Buried conductive substance | Warp rate $W_{L1}$ | $W_{L2}$ | $W_{C1}$ | $W_{C2}$ | $W_{XC}$ |
|---|---|---|---|---|---|---|---|---|---|
| Invention | 78 | Titanium | Pressing | TaN: 20.0 mass % WC: 80.0 mass % | 0.01 | 0.02 | 0.01 | 0.01 | 0.02 |
| Invention | 79 | Titanium | Pressing | TaN: 30.0 mass % WC: 70.0 mass % | 0.01 | 0.01 | 0.01 | 0.01 | 0.01 |
| Invention | 80 | Titanium | Pressing | TaN: 40.0 mass % WC: 60.0 mass % | 0.01 | 0.02 | 0.01 | 0.02 | 0.01 |
| Invention | 81 | Titanium | Pressing | TaN: 50.0 mass % WC: 50.0 mass % | 0.01 | 0.01 | 0.01 | 0.01 | 0.02 |

| Class | No. | Twist rate $T_{XL}$ | $T_{XC}$ | Roughness provision | Contact resistance to carbon paper (mΩcm²) | Ion release resistance | Conductive substance cost | Remarks |
|---|---|---|---|---|---|---|---|---|
| Invention | 78 | 0.01 | 0.01 | ○ | 6.5 | ◎ | ◎ | *78 |
| Invention | 79 | 0.01 | 0.01 | ○ | 5.9 | ◎ | ◎ | *79 |

TABLE 19-continued

Example (18)

| Class | No. | | | | | | | |
|---|---|---|---|---|---|---|---|---|
| Invention | 80 | 0.01 | 0.01 | ○ | 9.8 | ◎ | ◎ | *80 |
| Invention | 81 | 0.01 | 0.01 | ○ | 11 | ◎ | ○ | *81 |

TABLE 20

Example (19)

| Class | No. | Material | Working method | Buried conductive substance | Warp rate | | | | |
|---|---|---|---|---|---|---|---|---|---|
| | | | | | $W_{L1}$ | $W_{L2}$ | $W_{C1}$ | $W_{C2}$ | $W_{XC}$ |
| Invention | 82 | Titanium alloy 6%Al—4%V | Pressing | TaN: 0.02 mass % WC: 99.98 mass % | 0.01 | 0.02 | 0.01 | 0.01 | 0.02 |
| Invention | 83 | Titanium alloy 6%Al—4%V | Pressing | TaN: 0.1 mass % WC: 99.9 mass % | 0.01 | 0.02 | 0.01 | 0.02 | 0.02 |
| Invention | 84 | Titanium alloy 6%Al—4%V | Pressing | TaN: 1.0 mass % WC: 99.0 mass % | 0.01 | 0.02 | 0.01 | 0.01 | 0.02 |
| Invention | 85 | Titanium alloy 6%Al—4%V | Pressing | TaN: 10.0 mass % WC: 90.0 mass % | 0.01 | 0.02 | 0.01 | 0.02 | 0.01 |

| Class | No. | Twist rate | | Roughness provision | Contact resistance to carbon paper (mΩcm²) | Ion release resistance | Conductive substance cost | Remarks |
|---|---|---|---|---|---|---|---|---|
| | | $T_{XL}$ | $T_{XC}$ | | | | | |
| Invention | 82 | 0.01 | 0.01 | ○ | 7.5 | ◎ | ◎ | *82 |
| Invention | 83 | 0.01 | 0.01 | ○ | 6.5 | ◎ | ◎ | *83 |
| Invention | 84 | 0.01 | 0.01 | ○ | 5.5 | ◎ | ◎ | *84 |
| Invention | 85 | 0.01 | 0.01 | ○ | 6.9 | ◎ | ◎ | *85 |

TABLE 21

Example (20)

| Class | No. | Material | Working method | Buried conductive substance | Warp rate | | | | |
|---|---|---|---|---|---|---|---|---|---|
| | | | | | $W_{L1}$ | $W_{L2}$ | $W_{C1}$ | $W_{C2}$ | $W_{XC}$ |
| Invention | 86 | Titanium alloy 6%Al—4%V | Pressing | TaN: 20.0 mass % WC: 80.0 mass % | 0.01 | 0.02 | 0.01 | 0.01 | 0.02 |
| Invention | 87 | Titanium alloy 6%Al—4%V alloy | Pressing | TaN: 30.0 mass % WC: 70.0 mass % | 0.01 | 0.01 | 0.01 | 0.01 | 0.01 |
| Invention | 88 | Titanium alloy 6%Al—4%V | Pressing | TaN: 40.0 mass % WC: 60.0 mass % | 0.01 | 0.02 | 0.01 | 0.02 | 0.01 |
| Invention | 89 | Titanium alloy 6%Al—4%V | Pressing | TaN: 50.0 mass % WC: 50.0 mass % | 0.01 | 0.01 | 0.01 | 0.01 | 0.02 |

| Class | No. | Twist rate | | Roughness provision | Contact resistance to carbon paper (mΩcm²) | Ion release resistance | Conductive substance cost | Remarks |
|---|---|---|---|---|---|---|---|---|
| | | $T_{XL}$ | $T_{XC}$ | | | | | |
| Invention | 86 | 0.01 | 0.01 | ○ | 6.5 | ◎ | ◎ | *86 |
| Invention | 87 | 0.01 | 0.01 | ○ | 5.9 | ◎ | ◎ | *87 |
| Invention | 88 | 0.01 | 0.01 | ○ | 9.8 | ◎ | ◎ | *88 |
| Invention | 89 | 0.01 | 0.01 | ○ | 11 | ◎ | ○ | *89 |

(Remarks)

*1 Average particle size 200 μm superhard WC particles driven by 0.5 MPa into entire surface of separator surface relief parts.

*2 Average particle size 200 μm superhard WB particles driven by 0.5 MPa into entire surface of separator surface relief parts.

*3 Gold plated member

*4 Coated superhard core particles comprised of average particle size 100 μm superhard WC particles coated on surface with average particle size 20 μm or less Au powder driven by 0.05-0.3 MPa, based on procedure, into entire surface of separator surface relief parts.

*5 Coated superhard core particles comprised of average particle size 100 μm superhard WC particles coated on surface with average particle size 20 μm or less WC powder driven by 0.1-0.4 MPa, based on procedure, into entire surface of separator surface relief parts.

*6 Coated superhard core particles comprised of average particle size 100 μm superhard WC particles coated on surface with average particle size 20 μm or less WB powder driven by 0.005-0.3 MPa, based on procedure, into entire surface of separator surface relief parts.

*7 Coated superhard core particles comprised of average particle size 100 μm superhard WC particles coated on surface with average particle size 20 μm or less TaN powder driven by 0.1-0.3 MPa, based on procedure, into entire surface of separator surface relief parts.

*8 Coated superhard core particles comprised of average particle size 100 μm superhard WC particles coated on surface with average particle size 20 μm or less Au powder and coated superhard core particles coated with average particle size 20 μm or less WC powder mixed together and driven by 0.005-0.2 MPa, based on procedure, into entire surface of separator surface relief parts. Furthermore, partially fired for stress relief through mesh-shaped fixture to eliminate warp and twist.

*9 Coated superhard core particles comprised of average particle size 100 μm superhard WC particles coated on surface with average particle size 20 μm or less Au powder and coated superhard core particles coated with average particle size 20 μm or less WC powder mixed together and driven by 0.007-0.4 MPa, based on procedure, into entire surface of separator surface relief parts. Furthermore, partially fired for stress relief through mesh-shaped fixture to eliminate warp and twist.

*10 Coated superhard core particles comprised of average particle size 100 μm superhard WC particles coated on surface with average particle size 20 μm or less Au powder and coated superhard core particles coated with average particle size 20 μm or less WC powder mixed together and driven by 0.1-0.3 MPa, based on procedure, into entire surface of separator surface relief parts. Furthermore, partially fired for stress relief through mesh-shaped fixture to eliminate warp and twist.

*11 Coated superhard core particles comprised of average particle size 100 μm superhard WC particles coated on surface with average particle size 20 μm or less Au powder and coated superhard core particles coated with average particle size 20 μm or less WC powder mixed together and driven by 0.01-0.3 MPa, based on procedure, into entire surface of separator surface relief parts. Furthermore, partially fired for stress relief through mesh-shaped fixture to eliminate warp and twist.

*12 Coated superhard core particles comprised of average particle size 100 μm superhard WC particles coated on surface with average particle size 20 μm or less WC powder and coated superhard core particles coated with average particle size 20 μm or less WB powder mixed together and driven by 0.03-0.3 MPa, based on procedure, into entire surface of separator surface relief parts. Furthermore, partially fired for stress relief through mesh-shaped fixture to eliminate warp and twist.

*13 Coated superhard core particles comprised of average particle size 100 μm superhard WC particles coated on surface with average particle size 20 μm or less WC powder and coated superhard core particles coated with average particle size 20 μm or less WB powder mixed together and driven by 0.1-0.3 MPa, based on procedure, into entire surface of separator surface relief parts. Furthermore, partially fired for stress relief through mesh-shaped fixture to eliminate warp and twist.

*14 Coated superhard core particles comprised of average particle size 100 μm superhard WC particles coated on surface with average particle size 20 μm or less WC powder and coated superhard core particles coated with average particle size 20 μm or less WB powder mixed together and driven by 0.1-0.3 MPa, based on procedure, into entire surface of separator surface relief parts. Furthermore, partially fired for stress relief through mesh-shaped fixture to eliminate warp and twist.

*15 Coated superhard core particles comprised of average particle size 100 μm superhard WC particles coated on surface with average particle size 20 μm or less WC powder and coated superhard core particles coated with average particle size 20 μm or less WB powder mixed together and driven by 0.01-0.2 MPa, based on procedure, into entire surface of separator surface relief parts. Furthermore, partially fired for stress relief through mesh-shaped fixture to eliminate warp and twist.

*16 Coated superhard core particles comprised of average particle size 100 μm superhard WC particles coated on surface with average particle size 20 μm or less WB powder and coated superhard core particles coated with average particle size 20 μm or less Au powder mixed together and driven by 0.1-0.3 MPa, based on procedure, into entire surface of separator surface relief parts. Furthermore, partially fired for stress relief through mesh-shaped fixture to eliminate warp and twist.

*17 Coated superhard core particles comprised of average particle size 100 μm superhard WC particles coated on surface with average particle size 20 μm or less WB powder and coated superhard core particles coated with average particle size 20 μm or less Au powder mixed together and driven by 0.08-0.2 MPa, based on procedure, into entire surface of separator surface relief parts. Furthermore, partially fired for stress relief through mesh-shaped fixture to eliminate warp and twist.

*18 Coated superhard core particles comprised of average particle size 100 μm superhard WC particles coated on surface with average particle size 20 μm or less WB powder and coated superhard core particles coated with average particle size 20 μm or less Au powder mixed together and driven by 0.1-0.3 MPa, based on procedure, into entire surface of separator surface relief parts. Furthermore, partially fired for stress relief through mesh-shaped fixture to eliminate warp and twist.

*19 Coated superhard core particles comprised of average particle size 100 μm superhard WC particles coated on surface with average particle size 20 μm or less WB powder and coated superhard core particles coated with average particle size 20 μm or less Au powder mixed together and driven by 0.1-0.3 MPa, based on procedure, into entire surface of separator surface relief parts. Furthermore, partially fired for stress relief through mesh-shaped fixture to eliminate warp and twist.

*20 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.001-0.3 MPa, based on procedure, into entire surface of separator surface relief parts. Furthermore, fired through mesh-shaped fixture to eliminate warp and twist.

*21 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.1-0.3 MPa, based on procedure, into entire surface of separator surface relief parts. Furthermore, fired through mesh-shaped fixture to eliminate warp and twist.

*22 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.1-0.35 MPa, based on procedure, into entire surface of separator surface relief parts. Furthermore, fired through mesh-shaped fixture to eliminate warp and twist.

*23 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.1-0.3 MPa, based on procedure, into entire surface of separator surface relief parts. Furthermore, fired through mesh-shaped fixture to eliminate warp and twist.

*24 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.1-0.3 MPa, based on procedure, into entire surface of separator surface relief parts. Furthermore, fired through mesh-shaped fixture to eliminate warp and twist.

*25 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.07-0.3 MPa, based on procedure, into entire surface of separator surface relief parts. Furthermore, fired through mesh-shaped fixture to eliminate warp and twist.

*26 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.01-0.3 MPa, based on procedure, into entire surface of separator surface relief parts. Furthermore, fired through mesh-shaped fixture to eliminate warp and twist.

*27 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.1-0.3 MPa, based on procedure, into entire surface of separator surface relief parts. Furthermore, fired through mesh-shaped fixture to eliminate warp and twist.

*28 Coated superhard core particles comprised of average particle size 100 μm superhard WC particles coated on surface with average particle size 20 μm or less TaN powder and coated superhard core particles coated with average particle size 20 μm or less WB powder mixed together and driven by 0.02-0.3 MPa, based on procedure, into entire surface of separator surface relief parts. Furthermore, fired through mesh-shaped fixture to eliminate warp and twist.

*29 Coated superhard core particles comprised of average particle size 100 μm superhard WC particles coated on surface with average particle size 20 μm or less TaN powder and coated superhard core particles coated with average particle size 20 μm or less WB powder mixed together and driven by 0.1-0.3 MPa, based on procedure, into entire surface of separator surface relief parts. Furthermore, fired through mesh-shaped fixture to eliminate warp and twist.

*30 Coated superhard core particles comprised of average particle size 100 μm superhard WC particles coated on surface with average particle size 20 μm or less TaN powder and coated superhard core particles coated with average particle size 20 μm or less WCN powder mixed together and driven by 0.1-0.3 MPa, based on procedure, into entire surface of separator surface relief parts. Furthermore, fired through mesh-shaped fixture to eliminate warp and twist.

*31 Coated superhard core particles comprised of average particle size 100 μm superhard WC particles coated on surface with average particle size 20 μm or less TaN powder and coated superhard core particles coated with average particle size 20 μm or less WB powder mixed together and driven by 0.1-0.3 MPa, based on procedure, into entire surface of separator surface relief parts. Furthermore, fired through mesh-shaped fixture to eliminate warp and twist.

*32 Coated superhard core particles comprised of average particle size 100 μm superhard WC particles coated on surface with average particle size 20 μm or less TaN powder and coated superhard core particles coated with average particle size 20 μm or less WB powder mixed together and driven by 0.001-0.3 MPa, based on procedure, into entire surface of separator surface relief parts. Furthermore, fired through mesh-shaped fixture to eliminate warp and twist.

*33 Coated superhard core particles comprised of average particle size 100 μm superhard WC particles coated on surface with average particle size 20 μm or less TaN powder and coated superhard core particles coated with average particle size 20 μm or less WB powder mixed together and driven by 0.1-0.3 MPa, based on procedure, into entire surface of separator surface relief parts. Furthermore, fired through mesh-shaped fixture to eliminate warp and twist.

*34 Coated superhard core particles comprised of average particle size 100 μm superhard WC particles coated on surface with average particle size 20 μm or less TaN powder and coated superhard core particles coated with average particle size 20 μm or less WCN powder mixed together and driven by 0.01-0.25 MPa, based on procedure, into entire surface of separator surface relief parts. Furthermore, fired through mesh-shaped fixture to eliminate warp and twist.

*35 Coated superhard core particles comprised of average particle size 100 μm superhard WC particles coated on surface with average particle size 20 μm or less TaN powder and coated superhard core particles coated with average particle size 20 μm or less WB powder mixed together and driven by 0.1-0.3 MPa, based on procedure, into entire surface of separator surface relief parts. Furthermore, fired through mesh-shaped fixture to eliminate warp and twist.

*36 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.05-0.2 MPa, based on procedure, into entire surface of separator surface relief parts. Furthermore, fired through mesh-shaped fixture to eliminate warp and twist.

*37 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.01-0.2 MPa, based on procedure, into entire surface of separator surface relief parts. Furthermore, fired through mesh-shaped fixture to eliminate warp and twist.

*38 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.1-0.3 MPa, based on procedure, into entire surface of separator surface relief parts. Furthermore, fired through mesh-shaped fixture to eliminate warp and twist.

*39 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.038-0.25 MPa, based on procedure, into entire surface of separator surface relief parts. Furthermore, fired through mesh-shaped fixture to eliminate warp and twist.

*40 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.1-0.3 MPa, based on procedure, into entire surface of separator surface relief parts. Furthermore, fired through mesh-shaped fixture to eliminate warp and twist.

*41 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.1-0.2 MPa, based on procedure, into entire surface of separator surface relief parts. Furthermore, fired through mesh-shaped fixture to eliminate warp and twist.

*42 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.01-0.18 MPa, based on procedure, into entire surface of separator surface relief parts. Furthermore, fired through mesh-shaped fixture to eliminate warp and twist.

*43 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.15-0.3 MPa, based on procedure, into entire surface of separator surface relief parts. Furthermore, fired through mesh-shaped fixture to eliminate warp and twist.

*44 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.07-0.3 MPa, based on procedure, into entire surface of separator surface relief parts. Furthermore, fired through mesh-shaped fixture to eliminate warp and twist.

*45 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.1-0.3 MPa, based on procedure, into entire surface of separator surface relief parts. Furthermore, fired through mesh-shaped fixture to eliminate warp and twist.

*46 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.1-0.4 MPa, based on procedure, into entire surface of separator surface relief parts. Furthermore, fired through mesh-shaped fixture to eliminate warp and twist.

*47 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.1-0.3 MPa, based on procedure, into entire surface of separator surface relief parts. Furthermore, fired through mesh-shaped fixture to eliminate warp and twist.

*48 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.1-0.35 MPa, based on procedure, into entire surface of separator surface relief parts. Furthermore, fired through mesh-shaped fixture to eliminate warp and twist.

*49 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.1-0.3 MPa, based on procedure, into entire surface of separator surface relief parts. Furthermore, fired through mesh-shaped fixture to eliminate warp and twist.

*50 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.05-0.3 MPa, based on procedure, into entire surface of separator surface relief parts. Furthermore, fired through mesh-shaped fixture to eliminate warp and twist.

*51 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.1-0.3 MPa, based on procedure, into entire surface of separator surface relief parts. Furthermore, fired through mesh-shaped fixture to eliminate warp and twist.

*52 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.1-0.3 MPa, based on procedure, into entire surface of separator surface relief parts. Furthermore, fired through mesh-shaped fixture to eliminate warp and twist.

*53 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.02-0.3 MPa, based on procedure, into entire surface of separator surface relief parts. Furthermore, fired through mesh-shaped fixture to eliminate warp and twist.

*54 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.1-0.3 MPa, based on procedure, into entire surface of separator surface relief parts. Furthermore, fired through mesh-shaped fixture to eliminate warp and twist.

*55 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.01-0.3 MPa, based on procedure, into entire surface of separator surface relief parts. Furthermore, fired through mesh-shaped fixture to eliminate warp and twist.

*56 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.006-0.3 MPa, based on procedure, into entire surface of separator surface relief parts. Furthermore, fired through mesh-shaped fixture to eliminate warp and twist.

*57 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.02-0.4 MPa, based on procedure, into entire surface of separator surface relief parts. Furthermore, fired through mesh-shaped fixture to eliminate warp and twist.

*58 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.01-0.3 MPa, based on procedure, into entire surface of separator surface relief parts. Furthermore, fired through mesh-shaped fixture to eliminate warp and twist.

*59 Coated superhard core particles comprised of average particle size 100 μm superhard WC particles coated on surface with average particle size 20 μm or less TaN powder and coated superhard core particles coated with average particle size 20 μm or less WB powder and WC powder mixed together and driven by 0.1-0.3 MPa, based on procedure, into entire surface of separator surface relief parts. Furthermore, fired through mesh-shaped fixture to eliminate warp and twist.

*60 Average particle size 200 μm superhard WC particles driven by 0.5 Nra into entire surface of separator surface relief parts.

*61 Average particle size 200 μm superhard WE particles driven by 0.5 MPa into entire surface of separator surface relief parts.

*62 Gold plated member

*63 Coated superhard core particles comprised of average particle size 100 μm superhard WC particles coated on surface with average particle size 20 μm or less Au powder driven by 0.01-0.35 MPa, based on procedure, into entire surface of separator surface relief parts.

*64 Coated superhard core particles comprised of average particle size 100 μm superhard WC particles coated on surface with average particle size 20 μm or less WC powder driven by 0.1-0.3 MPa, based on procedure, into entire surface of separator surface relief parts.

*65 Coated superhard core particles comprised of average particle size 100 μm superhard WC particles coated on surface with average particle size 20 μm or less WB powder driven by 0.02-0.32 MPa, based on procedure, into entire surface of separator surface relief parts.

*66 Coated superhard core particles comprised of average particle size 100 μm superhard WC particles coated on surface with average particle size 20 μm or less TaN powder driven by 0.07-0.38 MPa, based on procedure, into entire surface of separator surface relief parts.

*67 Average particle size 200 μm superhard WC particles driven by 0.5 MPa into entire surface of separator surface relief parts.

*68 Average particle size 200 μm superhard WB particles driven by 0.5 MPa into entire surface of separator surface relief parts.

*69 Gold plated member

*70 Coated superhard core particles comprised of average particle size 100 μm superhard WC particles coated on surface with average particle size 20 μm or less Au powder driven by 0.06-0.25 MPa, based on procedure, into entire surface of separator surface relief parts.

*71 Coated superhard core particles comprised of average particle size 100 μm superhard WC particles coated on surface with average particle size 20 μm or less WC powder driven by 0.1-0.3 MPa, based on procedure, into entire surface of separator surface relief parts.

*72 Coated superhard core particles comprised of average particle size 100 μm superhard WC particles coated on surface with average particle size 20 μm or less WB powder driven by 0.008-0.1 MPa, based on procedure, into entire surface of separator surface relief parts.

*73 Coated superhard core particles comprised of average particle size 100 μm superhard WC particles coated on surface with average particle size 20 μm or less TaN powder driven by 0.01-0.3 MPa, based on procedure, into entire surface of separator surface relief parts.

*74 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.01-0.3 MPa, based on procedure, into entire surface of separator surface relief parts. Furthermore, fired through mesh-shaped fixture to eliminate warp and twist.

*75 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.05-0.3 MPa, based on procedure, into entire surface of separator surface relief parts. Furthermore, fired through mesh-shaped fixture to eliminate warp and twist.

*76 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.1-0.3 MPa, based on procedure, into entire surface of separator surface relief parts. Furthermore, fired through mesh-shaped fixture to eliminate warp and twist.

*77 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.08-0.3 MPa, based on procedure, into entire surface of separator surface relief parts. Furthermore, fired through mesh-shaped fixture to eliminate warp and twist.

*78 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.03-0.3 MPa, based on procedure, into entire surface of separator surface relief parts. Furthermore, fired through mesh-shaped fixture to eliminate warp and twist.

*79 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.1-0.3 MPa, based on procedure, into entire surface of separator surface relief parts. Furthermore, fired through mesh-shaped fixture to eliminate warp and twist.

*80 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.01-0.39 MPa, based on procedure, into entire surface of separator surface relief parts. Furthermore, fired through mesh-shaped fixture to eliminate warp and twist.

*81 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.1-0.3 MPa, based on procedure, into entire surface of separator surface relief parts. Furthermore, fired through mesh-shaped fixture to eliminate warp and twist.

*82 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.1-0.3 MPa, based on procedure, into entire surface of separator surface relief parts. Furthermore, fired through mesh-shaped fixture to eliminate warp and twist.

*83 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.1-0.3 MPa, based on procedure, into entire surface of separator surface relief parts. Furthermore, fired through mesh-shaped fixture to eliminate warp and twist.

*84 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.018-0.3 MPa, based on procedure, into entire surface of separator surface relief parts. Furthermore, fired through mesh-shaped fixture to eliminate warp and twist.

*85 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.05-0.1 MPa, based on procedure, into entire surface of separator surface relief parts. Furthermore, fired through mesh-shaped fixture to eliminate warp and twist.

*86 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.001-0.25 MPa, based on procedure, into entire surface of separator surface relief parts. Furthermore, fired through mesh-shaped fixture to eliminate warp and twist.

*87 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.1-0.3 MPa, based on procedure, into entire surface of separator surface relief parts. Furthermore, fired through mesh-shaped fixture to eliminate warp and twist.

*88 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.1-0.3 MPa, based on procedure, into entire surface of separator surface relief parts. Furthermore, fired through mesh-shaped fixture to eliminate warp and twist.

*89 Coated superhard core particles comprised of average particle size 100 μm superhard WC particles coated on surface with average particle size 20 μm or less TaN powder and coated superhard core particles coated with average particle size 20 μm or less WC powder mixed together and driven by 0.01-0.1 MPa, based on procedure, into entire surface of separator surface relief parts. Furthermore, fired through mesh-shaped fixture to eliminate warp and twist.

Example 21

High corrosion resistance stainless steel and titanium of a length of 50 mm, a width of 50 mm, and a thickness of 0.2 mm were used as base materials of the test materials. As conductive substance particles comprised of metal elements having at most one OH group bonded by metal aqua ions, ones comprised of VB, V8C7, VN, and their mixtures with average particle sizes of 5 μm to 50 μm coated on tungsten carbide superhard core particles with average particle sizes of 100 μm to 300 μm with a binder comprised of Cu mixed with the conductive substance in an amount of 1 wt % were driven into said test base material by a firing pressure of 0.3 MPa to 0.5 MPa to obtain test materials. Further, for comparison, TiN and TiC were driven into said test base materials as conductive substance particles having as ingredients metal elements having OH groups in the metal aqua ions by the blast method under similar conditions to obtain test materials.

After said blast treatment, the test materials were immersed in sulfuric acid set to a pH of 2 to 6 so as to clean them to remove oxides, cracks, dislocation, and other defects at the surfaces of the conductive particles. The immersion temperature was set to 40° C. to 90° C., while the immersion time was set to 2 hours. Details of said test materials are shown in Table 2 to Table 5.

The contact resistance value with respect to carbon paper was measured at a surface pressure of 10 kgf/cm$^2$ (1 MPa). When the measured value of the contact resistance is 15 mΩcm$^2$ or less, the contact resistance was judged to be good, while when it is over 15 mΩcm$^2$, the contact resistance was judged to be poor.

Further, the flatness of the separator defined by the above equations <1> to <7>, as shown in FIG. 3, was evaluated by finding the values of the indicators $W_{L1}$, $W_{L2}$, $W_{C1}$, $W_{C2}$, $W_{XC}$, $T_{XL}$, and $T_{XC}$ at predetermined positions near the four corners of the stainless steel separator or titanium separator when an origin is O, placing L near a corner in a rolling direction of the sheet from the origin O, C near a corner in a direction vertical to rolling from the origin O, and X near a corner in a diagonal direction from the origin O, a length of a line segment between OL is LL, a length of an OC line segment is LC, a length between OX is LX, a maximum strain height from the line OL to the center plane in a thickness direction of the worked member is HL1, one from the line CX is HL2, one from the line OC is HC1, one from the line LX is HC2, one from the line OX is HXC, and a distance between a point X and a plane formed by the three points O, L, and C is HXT. When none of the values of these $W_{L1}$, $W_{L2}$, $W_{C1}$, $W_{C2}$, $W_{XC}$, $T_{XL}$, and $T_{XC}$ is over 0.1, the flatness was judged to be good, while when even one of the values is over 0.1, the flatness was judged to be poor.

The amount of release of V ions from the VB, V$_8$C$_7$, and VN compound particles buried in the surface of the separator base material was examined by the following test method. The test material was allowed to stand in 300 ml of an aqueous solution of sulfuric acid adjusted to a pH2 at 80° C. for 300 hours while bubbling oxygen or hydrogen, then the amount of V ion release in the supernatant obtained by standing was quantified by ICP emission spectrometry. An amount of release of V ions into the sulfuric acid aqueous solution of 50 ppm or less was judged as a good ion release property, while one over 50 ppm was judged as a poor one.

The ratio of the oxide molecules at the surfaces of the conductive substance in the molecules of the surfaces of the conductive substance particles was quantitatively evaluated by using photoelectron spectrometry to separate into peaks and measure the intensity of the peak of the chemical shift of V oxide and quantifying the same. Further, the presence of surface oxides and dislocation, cracks, or other defects of the conductive substance particles was confirmed by observing a cross-section of the front surface parts of the buried particles by a transmission type electron microscope.

Table 22 to Table 25 show the test conditions and the test results.

TABLE 22

| Test material | Base material | Type of conductive substance ( ) indicate mass % | Ratio of oxides (%) | Conductive substance average particle size (μm) | Superhard core particles Average particle size (μm) | Blast firing pressure (MPa) | Cleaning treatment |
|---|---|---|---|---|---|---|---|
| 101 | Stainless steel | VB(100%) | 10 | 10 | 100 | 0.3 | Yes |
| 102 | Stainless steel | VB(100%) | 5 | 20 | 100 | 0.3 | Yes |
| 103 | Stainless steel | VB(100%) | 50 | 30 | 100 | 0.3 | Yes |
| 104 | Stainless steel | VB(100%) | 70 | 20 | 100 | 0.3 | No |
| 105 | Stainless steel | VB(100%) | 2 | 20 | 150 | 0.4 | Yes |
| 106 | Stainless steel | VB(100%) | 10 | 30 | 200 | 0.5 | Yes |
| 107 | Stainless steel | VB(100%) | 30 | 50 | 200 | 0.3 | Yes |
| 108 | Stainless steel | V$_8$C$_7$(100%) | 10 | 10 | 100 | 0.3 | Yes |
| 109 | Stainless steel | V$_8$C$_7$(100%) | 5 | 3 | 200 | 0.3 | Yes |
| 110 | Stainless steel | V$_8$C$_7$(100%) | 35 | 10 | 300 | 0.3 | Yes |
| 111 | Stainless steel | V$_8$C$_7$(100%) | 40 | 5 | 300 | 0.3 | No |
| 112 | Stainless steel | V$_8$C$_7$(100%) | 4 | 5 | 200 | 0.4 | Yes |
| 113 | Stainless steel | V$_8$C$_7$(100%) | 10 | 3 | 150 | 0.5 | Yes |
| 114 | Stainless steel | V$_8$C$_7$(100%) | 30 | 50 | 100 | 0.3 | Yes |
| 115 | Stainless steel | VN(100%) | 10 | 10 | 200 | 0.3 | Yes |
| 116 | Stainless steel | VN(100%) | 7 | 10 | 150 | 0.3 | Yes |
| 117 | Stainless steel | VN(100%) | 35 | 20 | 200 | 0.3 | Yes |

TABLE 22-continued

| | | | | | | | |
|---|---|---|---|---|---|---|---|
| 118 | Stainless steel | VN(100%) | <u>50</u> | 20 | 200 | 0.3 | <u>No</u> |
| 119 | Stainless steel | VN(100%) | 3 | 5 | 200 | 0.4 | Yes |
| 120 | Stainless steel | VN(100%) | 10 | 20 | 200 | <u>0.5</u> | Yes |
| 121 | Stainless steel | VN(100%) | 30 | <u>50</u> | 150 | 0.3 | Yes |
| 122 | Stainless steel | VB(50%) + V$_8$C$_7$(50%) | 10 | <u>10</u> | 150 | 0.3 | Yes |
| 123 | Stainless steel | VB(50%) + V$_8$C$_7$(50%) | 5 | 5 | 200 | 0.3 | Yes |
| 124 | Stainless steel | VB(50%) + V$_8$C$_7$(50%) | <u>50</u> | 20 | 200 | 0.3 | Yes |
| 125 | Stainless steel | VB(50%) + V$_8$C$_7$(50%) | <u>70</u> | 20 | 150 | 0.3 | <u>No</u> |
| 126 | Stainless steel | VB(50%) + V$_8$C$_7$(50%) | 2 | 20 | 150 | 0.4 | Yes |

| | Cleaning treatment conditions | | Contact | | | | |
|---|---|---|---|---|---|---|---|
| Test material | Sulfuric acid pH | Temperture (° C.) | Dislocations and cracks | resistance evaluation | Ion release evaluation | Flatness evaluation | Class |
| 101 | 3 | 80 | No | ○ | ○ | ○ | Invention |
| 102 | 3 | 80 | No | ○ | ○ | ○ | Invention |
| 103 | <u>6</u> | 80 | Yes | X | X | ○ | Comp. ex. |
| 104 | | | Yes | X | X | ○ | Comp. ex. |
| 105 | 3 | 80 | No | ○ | ○ | ○ | Invention |
| 106 | 3 | 80 | No | ○ | ○ | X | Invention |
| 107 | 3 | 80 | No | X | ○ | ○ | Comp. ex. |
| 108 | 3 | 70 | No | ○ | ○ | ○ | Invention |
| 109 | 3 | 60 | No | ○ | ○ | ○ | Invention |
| 110 | <u>6</u> | 80 | Yes | X | X | X | Comp. ex. |
| 111 | | | Yes | X | X | X | Comp. ex. |
| 112 | 3 | 80 | No | ○ | ○ | ○ | Invention |
| 113 | 3 | 70 | No | ○ | ○ | X | Invention |
| 114 | 3 | 80 | No | X | ○ | ○ | Comp. ex. |
| 115 | 3 | 80 | No | ○ | ○ | ○ | Invention |
| 116 | 3 | 80 | No | ○ | ○ | ○ | Invention |
| 117 | <u>6</u> | 80 | Yes | X | X | ○ | Comp. ex. |
| 118 | | | Yes | X | X | ○ | Comp. ex. |
| 119 | 3 | 80 | No | ○ | ○ | ○ | Invention |
| 120 | 3 | 80 | No | ○ | ○ | X | Invention |
| 121 | 3 | 80 | No | X | ○ | ○ | Comp. ex. |
| 122 | 3 | <u>90</u> | No | X | ○ | ○ | Comp. ex. |
| 123 | 3 | 80 | No | ○ | ○ | ○ | Invention |
| 124 | <u>6</u> | 40 | Yes | X | X | ○ | Comp. ex. |
| 125 | | | Yes | X | X | ○ | Comp. ex. |
| 126 | 3 | 80 | No | ○ | ○ | ○ | Invention |

○: good, X: poor

TABLE 23

(Continuation 1 of Table 22)

| Test material | Base material | Type of conductive substance ( ) indicate mass % | Ratio of oxides (%) | Conductive substance average particle size (μm) | Superhard core particles Average particle size (μm) | Blast firing pressure (MPa) | Cleaning treatment |
|---|---|---|---|---|---|---|---|
| 127 | Stainless steel | VB(50%) + V$_8$C$_7$(50%) | 10 | 20 | <u>300</u> | <u>0.5</u> | Yes |
| 128 | Stainless steel | VB(50%) + V$_8$C$_7$(50%) | 30 | <u>50</u> | 150 | 0.3 | Yes |
| 129 | Stainless steel | VN(50%) + V$_8$C$_7$(50%) | 10 | 10 | 150 | 0.3 | Yes |
| 130 | Stainless steel | VN(50%) + V$_8$C$_7$(50%) | 5 | 15 | 200 | 0.3 | Yes |
| 131 | Stainless steel | VN(50%) + V$_8$C$_7$(50%) | <u>40</u> | 20 | 200 | 0.3 | Yes |
| 132 | Stainless steel | VN(50%) + V$_8$C$_7$(50%) | <u>65</u> | 20 | 200 | 0.3 | <u>No</u> |
| 133 | Stainless steel | VN(50%) + V$_8$C$_7$(50%) | 4 | 10 | 200 | 0.4 | Yes |
| 134 | Stainless steel | VN(50%) + V$_8$C$_7$(50%) | 10 | 20 | 200 | <u>0.5</u> | Yes |
| 135 | Stainless steel | VN(50%) + V$_8$C$_7$(50%) | 30 | <u>50</u> | 200 | 0.3 | Yes |
| 136 | Stainless steel | VB(20%) + V$_8$C$_7$(80%) | 10 | <u>10</u> | <u>300</u> | 0.3 | Yes |
| 137 | Stainless steel | VB(20%) + V$_8$C$_7$(80%) | 5 | 3 | 150 | 0.3 | Yes |
| 138 | Stainless steel | VB(20%) + V$_8$C$_7$(80%) | <u>50</u> | 20 | 150 | 0.3 | Yes |
| 139 | Stainless steel | VB(20%) + V$_8$C$_7$(80%) | <u>70</u> | 20 | 150 | 0.3 | <u>No</u> |
| 140 | Stainless steel | VB(20%) + V$_8$C$_7$(80%) | 10 | 5 | 150 | 0.4 | Yes |
| 141 | Stainless steel | VB(20%) + V$_8$C$_7$(80%) | 10 | 20 | 200 | <u>0.5</u> | Yes |
| 142 | Stainless steel | VB(20%) + V$_8$C$_7$(80%) | 30 | <u>50</u> | 200 | 0.3 | Yes |
| 143 | Stainless steel | VB(50%) + VN(50%) | 10 | 10 | 150 | 0.3 | Yes |
| 144 | Stainless steel | VB(50%) + VN(50%) | 15 | 10 | 200 | 0.3 | Yes |
| 145 | Stainless steel | VB(50%) + VN(50%) | <u>45</u> | 20 | 200 | 0.3 | Yes |
| 146 | Stainless steel | VB(50%) + VN(50%) | <u>60</u> | 20 | 150 | 0.3 | <u>No</u> |
| 147 | Stainless steel | VB(50%) + VN(50%) | 20 | 20 | 150 | 0.4 | Yes |
| 148 | Stainless steel | VB(50%) + VN(50%) | 10 | 20 | 200 | <u>0.5</u> | Yes |

TABLE 23-continued (Continuation 1 of Table 22)

| | | | | | | | |
|---|---|---|---|---|---|---|---|
| 149 | Stainless steel | VB(50%) + VN(50%) | 30 | 50 | 150 | 0.3 | Yes |
| 150 | Stainless steel | TiN(100%) | 60 | 20 | 100 | 0.3 | Yes |
| 151 | Stainless steel | TiC(100%) | 50 | 20 | 100 | 0.3 | Yes |
| 152 | Stainless steel | TiC(50%) +TiN(50%) | 50 | 20 | 100 | 0.3 | Yes |

| Test material | Cleaning treatment conditions | | Dislocations and cracks | Contact resistance evaluation | Ion release evaluation | Flatness evaluation | Class |
|---|---|---|---|---|---|---|---|
| | Sulfurice acid pH | Temperature (° C.) | | | | | |
| 127 | 3 | 80 | No | ○ | ○ | X | Invention |
| 128 | 3 | 80 | No | X | ○ | ○ | Comp. ex. |
| 129 | 3 | 80 | No | ○ | ○ | ○ | Invention |
| 130 | 3 | 80 | No | ○ | ○ | ○ | Invention |
| 131 | 6 | 40 | Yes | X | X | ○ | Comp. ex. |
| 132 | | | Yes | ○ | X | ○ | Comp. ex. |
| 133 | 3 | 80 | No | ○ | ○ | ○ | Invention |
| 134 | 3 | 80 | No | ○ | ○ | X | Invention |
| 135 | 3 | 80 | No | X | ○ | ○ | Comp. ex. |
| 136 | 3 | 80 | No | ○ | ○ | X | Invention |
| 137 | 3 | 80 | No | ○ | ○ | ○ | Invention |
| 138 | 6 | 40 | Yes | X | X | ○ | Comp. ex. |
| 139 | | | Yes | X | X | ○ | Comp. ex. |
| 140 | 3 | 80 | No | ○ | ○ | ○ | Invention |
| 141 | 3 | 80 | No | ○ | ○ | X | Invention |
| 142 | 3 | 80 | No | X | ○ | ○ | Comp. ex. |
| 143 | 3 | 80 | No | ○ | ○ | ○ | Invention |
| 144 | 3 | 80 | No | ○ | ○ | ○ | Invention |
| 145 | 6 | 80 | Yes | X | X | ○ | Comp. ex. |
| 146 | | | Yes | X | X | ○ | Comp. ex. |
| 147 | 3 | 80 | No | ○ | ○ | ○ | Invention |
| 148 | 3 | 80 | No | ○ | ○ | X | Invention |
| 149 | 3 | 80 | No | X | ○ | ○ | Comp. ex. |
| 150 | 3 | 80 | No | X | ○ | ○ | Comp. ex. |
| 151 | 3 | 80 | No | X | ○ | ○ | Comp. ex. |
| 152 | 3 | 80 | No | X | ○ | ○ | Comp. ex. |

○: good, X: poor

TABLE 24

(Continuation 2 of Table 22)

| Test material | Base material | Type of conductive substance ( ) indicate mass % | Ratio of oxides (%) | Conductive substance average particle size (μm) | Superhard core particles Average particle size (μm) | Blast firing pressure (MPa) | Cleaning treatment |
|---|---|---|---|---|---|---|---|
| 153 | Titanium | VB(100%) | 10 | 10 | 100 | 0.1 | Yes |
| 154 | Titanium | VB(100%) | 5 | 20 | 100 | 0.2 | Yes |
| 155 | Titanium | VB(100%) | 50 | 30 | 100 | 0.3 | Yes |
| 156 | Titanium | VB(100%) | 70 | 20 | 100 | 0.3 | No |
| 157 | Titanium | VB(100%) | 2 | 20 | 150 | 0.05 | Yes |
| 158 | Titanium | VB(100%) | 10 | 30 | 200 | 0.5 | Yes |
| 159 | Titanium | VB(100%) | 30 | 50 | 200 | 0.3 | Yes |
| 160 | Titanium | $V_8C_7$(100%) | 10 | 10 | 100 | 0.02 | Yes |
| 161 | Titanium | $V_8C_7$(100%) | 5 | 3 | 200 | 0.1 | Yes |
| 162 | Titanium | $V_8C_7$(100%) | 35 | 10 | 300 | 0.1 | Yes |
| 163 | Titanium | $V_8C_7$(100%) | 40 | 5 | 300 | 0.1 | No |
| 164 | Titanium | $V_8C_7$(100%) | 4 | 5 | 200 | 0.05 | Yes |
| 165 | Titanium | $V_8C_7$(100%) | 10 | 3 | 150 | 0.5 | Yes |
| 166 | Titanium | $V_8C_7$(100%) | 30 | 50 | 100 | 0.05 | Yes |
| 167 | Titanium | VN(100%) | 10 | 10 | 200 | 0.1 | Yes |
| 168 | Titanium | VN(100%) | 7 | 10 | 150 | 0.1 | Yes |
| 169 | Titanium | VN(100%) | 35 | 20 | 200 | 0.1 | Yes |
| 170 | Titanium | VN(100%) | 50 | 20 | 200 | 0.1 | No |
| 171 | Titanium | VN(100%) | 3 | 5 | 200 | 0.01 | Yes |
| 172 | Titanium | VN(100%) | 10 | 20 | 200 | 0.5 | Yes |
| 173 | Titanium | VN(100%) | 30 | 50 | 150 | 0.1 | Yes |
| 174 | Titanium | VB(50%) + $V_8C_7$(50%) | 10 | 10 | 150 | 0.1 | Yes |
| 175 | Titanium | VB(50%) + $V_8C_7$(50%) | 5 | 5 | 200 | 0.05 | Yes |

TABLE 24-continued (Continuation 2 of Table 22)

| | | | | | | | |
|---|---|---|---|---|---|---|---|
| 176 | Titanium | VB(50%) + V$_8$C$_7$(50%) | <u>50</u> | 20 | 200 | 0.2 | Yes |
| 177 | Titanium | VB(50%) + V$_8$C$_7$(50%) | <u>70</u> | 20 | 150 | 0.2 | <u>No</u> |

| Test material | Cleaning treatment conditions Sulfuric acid pH | Temperature (°C.) | Dislocations and cracks | Contact resistance evaluation | Ion release evaluation | Flatness evaluation | Class |
|---|---|---|---|---|---|---|---|
| 153 | 3 | 80 | No | ○ | ○ | ○ | Invention |
| 154 | 3 | 80 | No | ○ | ○ | ○ | Invention |
| 155 | <u>6</u> | 80 | Yes | X | X | ○ | Comp. ex. |
| 156 | | | Yes | X | X | ○ | Comp. ex. |
| 157 | 3 | 80 | No | ○ | ○ | ○ | Invention |
| 158 | 3 | 80 | No | ○ | ○ | X | Invention |
| 159 | 3 | 80 | No | X | ○ | ○ | Comp. ex. |
| 160 | 3 | 70 | No | ○ | ○ | ○ | Invention |
| 161 | 3 | 60 | No | ○ | ○ | ○ | Invention |
| 162 | <u>6</u> | 80 | Yes | X | X | X | Comp. ex. |
| 163 | | | Yes | X | X | X | Comp. ex. |
| 164 | 3 | 80 | No | ○ | ○ | ○ | Invention |
| 165 | 3 | 70 | No | ○ | ○ | X | Invention |
| 166 | 3 | 80 | No | X | ○ | ○ | Comp. ex. |
| 167 | 3 | 80 | No | ○ | ○ | ○ | Invention |
| 168 | 3 | 80 | No | ○ | ○ | ○ | Invention |
| 169 | <u>6</u> | 80 | Yes | X | X | ○ | Comp. ex. |
| 170 | | | Yes | X | X | ○ | Comp. ex. |
| 171 | 3 | 80 | No | ○ | ○ | ○ | Invention |
| 172 | 3 | 80 | No | ○ | ○ | X | Invention |
| 173 | 3 | 80 | No | X | ○ | ○ | Comp. ex. |
| 174 | 3 | <u>90</u> | No | X | ○ | ○ | Comp. ex. |
| 175 | 3 | 80 | No | ○ | ○ | ○ | Invention |
| 176 | <u>6</u> | 40 | Yes | X | X | ○ | Comp. ex. |
| 177 | | | Yes | X | X | ○ | Comp. ex. |

○: good, X: poor

TABLE 25

(Continuation 3 of Table 22)

| Test material | Base material | Type of conductive substance ( ) indicate mass % | Ratio of oxides (%) | Conductive substance average particle size (μm) | Superhard core particles Average particle size (μm) | Blast firing pressure (MPa) | Cleaning treatment |
|---|---|---|---|---|---|---|---|
| 178 | Titanium | VB(50%) + V$_8$C$_7$(50%) | 2 | 20 | 150 | 0.3 | Yes |
| 179 | Titanium | VB(50%) + V$_8$C$_7$(50%) | 10 | 20 | <u>300</u> | <u>0.5</u> | Yes |
| 180 | Titanium | VB(50%) + V$_8$C$_7$(50%) | 30 | <u>50</u> | 150 | 0.2 | Yes |
| 181 | Titanium | VN(50%) + V$_8$C$_7$(50%) | 10 | 10 | 150 | 0.2 | Yes |
| 182 | Titanium | VN(50%) + V$_8$C$_7$(50%) | 5 | 15 | 200 | 0.2 | Yes |
| 183 | Titanium | VN(50%) + V$_8$C$_7$(50%) | <u>40</u> | 20 | 200 | 0.1 | Yes |
| 184 | Titanium | VN(50%) + V$_8$C$_7$(50%) | <u>65</u> | 20 | 200 | 0.1 | <u>No</u> |
| 185 | Titanium | VN(50%) + V$_8$C$_7$(50%) | 4 | 10 | 200 | 0.3 | Yes |
| 186 | Titanium | VN(50%) + V$_8$C$_7$(50%) | 10 | 20 | 200 | <u>0.5</u> | Yes |
| 187 | Titanium | VN(50%) + V$_8$C$_7$(50%) | 30 | <u>50</u> | 200 | 0.1 | Yes |
| 188 | Titanium | VB(20%) + V$_8$C$_7$(80%) | 10 | 10 | <u>300</u> | 0.1 | Yes |
| 189 | Titanium | VB(20%) + V$_8$C$_7$(80%) | 5 | 3 | 150 | 0.2 | Yes |
| 190 | Titanium | VB(20%) + V$_8$C$_7$(80%) | 50 | 20 | 150 | 0.2 | Yes |
| 191 | Titanium | VB(20%) + V$_8$C$_7$(80%) | 70 | 20 | 150 | 0.2 | <u>No</u> |
| 192 | Titanium | VB(20%) + V$_8$C$_7$(80%) | 10 | 5 | 150 | 0.01 | Yes |
| 193 | Titanium | VB(20%) + V$_8$C$_7$(80%) | 10 | 20 | 200 | <u>0.5</u> | Yes |
| 194 | Titanium | VB(20%) + V$_8$C$_7$(80%) | 30 | <u>50</u> | 200 | 0.1 | Yes |
| 195 | Titanium | VB(50%) + VN(50%) | 10 | 10 | 150 | 0.1 | Yes |
| 196 | Titanium | VB(50%) + VN(50%) | 15 | 10 | 200 | 0.1 | Yes |
| 197 | Titanium | VB(50%) + VN(50%) | <u>45</u> | 20 | 200 | 0.1 | Yes |
| 198 | Titanium | VB(50%) + VN(50%) | <u>60</u> | 20 | 150 | 0.1 | <u>No</u> |
| 199 | Titanium | VB(50%) + VN(50%) | 20 | 20 | 150 | 0.2 | Yes |
| 200 | Titanium | VB(50%) + VN(50%) | 10 | 20 | 200 | <u>0.5</u> | Yes |
| 201 | Titanium | VB(50%) + VN(50%) | 30 | <u>50</u> | 150 | 0.1 | Yes |
| 202 | Titanium | <u>TiN(100%)</u> | <u>60</u> | 20 | 100 | 0.1 | Yes |
| 203 | Titanium | <u>TiC(100%)</u> | <u>50</u> | 20 | 100 | 0.1 | Yes |
| 204 | Titanium | <u>TiC(50%) +TiN(50%)</u> | <u>50</u> | 20 | 100 | 0.1 | Yes |

TABLE 25-continued (Continuation 3 of Table 22)

| | Cleaning treatment conditions | | | Contact | | | |
|---|---|---|---|---|---|---|---|
| Test material | Sulfuric acid pH | Temperature (° C.) | Dislocations and cracks | resistance evaluation | Ion release evaluation | Flatness evaluation | Class |
| 178 | 3 | 80 | No | ○ | ○ | ○ | Invention |
| 179 | 3 | 80 | No | ○ | ○ | X | Invention |
| 180 | 3 | 80 | No | X | ○ | ○ | Comp. ex. |
| 181 | 3 | 80 | No | ○ | ○ | ○ | Invention |
| 182 | 3 | 80 | No | ○ | ○ | ○ | Invention |
| 183 | <u>6</u> | 40 | Yes | X | X | ○ | Comp. ex. |
| 184 | | | Yes | ○ | X | ○ | Comp. ex. |
| 185 | 3 | 80 | No | ○ | ○ | ○ | Invention |
| 186 | 3 | 80 | No | ○ | ○ | X | Invention |
| 187 | 3 | 80 | No | X | ○ | ○ | Comp. ex. |
| 188 | 3 | 80 | No | ○ | ○ | X | Invention |
| 189 | 3 | 80 | No | ○ | ○ | ○ | Invention |
| 190 | <u>6</u> | 40 | Yes | X | X | ○ | Comp. ex. |
| 191 | | | Yes | X | X | ○ | Comp. ex. |
| 192 | 3 | 80 | No | ○ | ○ | ○ | Invention |
| 193 | 3 | 80 | No | ○ | ○ | X | Invention |
| 194 | 3 | 80 | No | X | ○ | ○ | Comp. ex. |
| 195 | 3 | 80 | No | ○ | ○ | ○ | Invention |
| 196 | 3 | 80 | No | ○ | ○ | ○ | Invention |
| 197 | <u>6</u> | 80 | Yes | X | X | ○ | Comp. ex. |
| 198 | | | Yes | X | X | ○ | Comp. ex. |
| 199 | 3 | 80 | No | ○ | ○ | ○ | Invention |
| 200 | 3 | 80 | No | ○ | ○ | X | Invention |
| 201 | 3 | 80 | No | X | ○ | ○ | Comp. ex. |
| 202 | 3 | 80 | No | X | ○ | ○ | Comp. ex. |
| 203 | 3 | 80 | No | X | ○ | ○ | Comp. ex. |
| 204 | 3 | 80 | No | X | ○ | ○ | Comp. ex. |

○: good, X: poor

In Table 22 to Table 25, Test Material Nos. 103, 104, 107, 110, 111, 114, 117, 118, 121, 122, 124, 125, 128, 131, 132, 135, 138, 139, 142, 145, 146, 149 to 152, 155, 156, 159, 162, 163, 166, 169, 170, 173, 174, 176, 177, 180, 183, 184, 187, 190, 191, 194, 197, 198, and 201 to 204 are comparative examples and had at least one of the types, average particle sizes, and mass ratios of surface layer metal oxides to particles as a whole of conductive substance particles and conditions of pH and temperature at the time of pickling outside the ranges provided for by the present invention, so were not able to satisfy the evaluation of both the initial contact resistance of the separator surface and metal ion release affecting deterioration of the low contact resistance at the time of use of the fuel cell.

On the other hand: the Test Material Nos. 101, 102, 105, 106, 108, 109, 112, 113, 115, 116, 119, 120, 123, 126, 127, 129, 130, 133, 134, 136, 137, 140, 141, 143, 144, 147, 148, 153, 154, 157, 158, 160, 161, 164, 165, 167, 168, 171, 172, 175, 178, 179, 181, 182, 185, 186, 188, 189, 192, and 193 are examples of the present invention and had types, average particle sizes, and mass ratios of surface layer metal oxides to particles as a whole of conductive substance particles and conditions of pH and temperature at the time of pickling in the ranges provided for by the present invention, so satisfied evaluation of both the initial contact resistance of the separator surface and metal ion release affecting deterioration of the low contact resistance at the time of use of the fuel cell.

Further, among these invention examples, Test Material Nos. 101, 102, 105, 108, 109, 112, 115, 116, 119, 123, 126, 129, 130, 133, 137, 140, 143, 144, 147, 153, 154, 157, 160, 161, 164, 167, 168, 171, 175, 178, 181, 182, 185, 189, 192, 195, 196, and 199 had not only the above conditions provided for by the present invention, but also the blast treatment conditions of the average particle size and firing pressure of the superhard core particles in the preferable ranges, so gave more preferable results of satisfying the evaluation of both the initial contact resistance of the separator surface and metal ion release affecting deterioration of the low contact resistance at the time of use of the fuel cell and the evaluation of the flatness as well.

The invention claimed is:

1. A method of evaluation of warp and twist of a solid polymer fuel cell separator comprised of stainless steel, titanium, or a titanium alloy at part or all of the surface of which a low ion release conductive substance is buried,
    said solid polymer fuel cell separator characterized in that
    said separator surface has an arithmetic mean roughness (Ra) of 0.5 to 5.0 µm, a 10-point mean roughness (Rz) of 3 to 20 µm, and an average spacing of surface relief shapes (Sm) of 300 µm or less,
    at predetermined positions near the four corners of said separator, when an origin is O, placing L near a corner in a rolling direction of the sheet from the origin O, C near a corner in a direction vertical to rolling direction from the origin O, and X near a corner in a diagonal direction from the origin O, a length of a line segment between OL is LL, a length of an OC line segment is LC, a length between OX is LX, a maximum strain height from the line OL to the center plane in a thickness direction of the separator is HL1, from the line CX is HL2, from the line OC is HC1, from the line LX is HC2, from the line OX is HXC, and a distance between point X and a plane formed by points O, L, and C is HXT, the values of warp rates $W_{L1}$, $W_{L2}$, $W_{C1}$, $W_{C2}$, and $W_{XC}$ defined by equation <1> to equation <5> and the values of twist rates $T_{XL}$ and $T_{XC}$ defined by equation <6> to equation <7> are 0.1 or less, and the contact resistance value with respect to carbon paper is 15 mΩcm² or less at a surface pressure of 1 MPa:

$$\text{Front side } L \text{ direction warp rate: } W_{L1} = \frac{|HL1|}{LL} \quad <1>$$

$$\text{Back side } L \text{ direction warp rate: } W_{L2} = \frac{|HL2|}{LL} \quad <2>$$

$$\text{Left side } C \text{ direction warp rate: } W_{C1} = \frac{|HC1|}{LC} \quad <3>$$

$$\text{Right side } C \text{ direction warp rate: } W_{C2} = \frac{|HC2|}{LC} \quad <4>$$

$$\text{Diagonal direction warp rate: } W_{XC} = \frac{|HXC|}{LX} \quad <5>$$

$$L \text{ direction length reference twist rate: } T_{XL} = \frac{|HXT|}{LL} \quad <6>$$

$$C \text{ direction length reference twist rate: } T_{XC} = \frac{|HXT|}{LC} \quad <7>$$

wherein said method of evaluation of warp and twist of a separator measures the 3D shape of said separator by a laser displacement meter and calculates digitalized 3D displacement data to calculate the values of equation <1> to equation <7>.

2. A method of evaluation of warp and twist of a solid polymer fuel cell separator as set forth in claim 1, wherein said low ion release conductive substance contains at least one of Au, WC, and WB and a balance of unavoidable impurities.

3. A method of evaluation of warp and twist of a solid polymer fuel cell separator as set forth in claim 1, wherein said low ion release conductive substance contains TaN or TaN and at least one of WC and WB mixed together and a balance of unavoidable impurities.

4. A method of evaluation of warp and twist of a solid polymer fuel cell separator as set forth in claim 2 or 3, containing as said unavoidable impurities at least one of Co, Cr, Ni, Fe, Cu, and Sn at the surface of said solid polymer fuel cell separator surface.

5. A method of evaluation of warp and twist of a solid polymer fuel cell separator as set forth in claim 1, wherein said low ion release conductive substance is one or more of VB, $V_8C_7$, and VN.

6. A method of evaluation of warp and twist of a solid polymer fuel cell separator as set forth in claim 1, wherein said low ion release conductive substance has an average particle size of 0.01 to 20 μm and a mass ratio of metal oxides formed at the surface layer to the conductive substance particles as a whole is 30% or less.

* * * * *